US010900831B2

(12) United States Patent
Gomi

(10) Patent No.: US 10,900,831 B2
(45) Date of Patent: Jan. 26, 2021

(54) SPECTROSCOPIC MEASUREMENT APPARATUS, ELECTRONIC APPARATUS, AND SPECTROSCOPIC MEASUREMENT METHOD

(71) Applicant: Seiko Epson Corporation, Tokyo (JP)

(72) Inventor: Tsugio Gomi, Fujimi (JP)

(73) Assignee: Seiko Epson Corporation

( * ) Notice: Subject to any disclaimer, the term of this patent is extended or adjusted under 35 U.S.C. 154(b) by 0 days.

(21) Appl. No.: 16/528,735

(22) Filed: Aug. 1, 2019

(65) Prior Publication Data

US 2020/0041343 A1 Feb. 6, 2020

(30) Foreign Application Priority Data

Aug. 2, 2018 (JP) .................. 2018-145666

(51) Int. Cl.
*G01J 3/10* (2006.01)
*G01J 3/12* (2006.01)

(52) U.S. Cl.
CPC .. *G01J 3/10* (2013.01); *G01J 3/12* (2013.01); *G01J 2003/102* (2013.01); *G01J 2003/1269* (2013.01)

(58) Field of Classification Search
CPC ...... G01J 3/0278; G01J 3/0291; G01J 3/0297; G01J 3/10; G01J 3/102; G01J 3/26; G01J 2003/102; G01J 2003/104; G01J 2003/262; G01J 2003/265; G01N 21/251; G01N 21/2558; G01N 21/31; G01N 21/474; G01N 2021/3181; G01N 2021/4757; G01N 2021/4759
See application file for complete search history.

(56) References Cited

U.S. PATENT DOCUMENTS

| | | | |
|---|---|---|---|
| 2006/0192957 A1* | 8/2006 | Frick | G01J 3/10 356/328 |
| 2006/0193512 A1 | 8/2006 | Orelli et al. | |
| 2009/0242803 A1 | 10/2009 | Imura | |
| 2012/0133948 A1* | 5/2012 | Funamoto | G01J 3/027 356/451 |

(Continued)

FOREIGN PATENT DOCUMENTS

| | | |
|---|---|---|
| JP | 2006-227012 A | 8/2006 |
| JP | 2009-236486 A | 10/2009 |

(Continued)

*Primary Examiner* — Michael A Lyons
(74) *Attorney, Agent, or Firm* — Harness, Dickey & Pierce, P.L.C.

(57) ABSTRACT

A spectroscopic measurement apparatus includes a light emitter simultaneously emitting light including light having all wavelengths in a wavelength range from 400 nm to 700 nm to a measurement target, a light disperser dispersing a reflected light reflected by the measurement target to a predetermined wavelength, a light receiver that receives the light dispersed by the light disperser and outputs a second light reception amount indicating a light intensity of the received light, and a calculator that receives the second light reception amount of each wavelength and calculates a reflection spectrum when the measurement target is irradiated with light, in which the calculator calculates reflectance of a predetermined wavelength using the second light reception amounts of a plurality of wavelengths.

10 Claims, 16 Drawing Sheets

(56) References Cited

U.S. PATENT DOCUMENTS

2014/0052402 A1    2/2014  Arai
2015/0377706 A1*  12/2015  Sano ..................... G01J 3/2823
                                                            356/456
2019/0162594 A1*  5/2019  Gomi ........................ G01J 3/10

FOREIGN PATENT DOCUMENTS

| JP | 2014-038042 A | 2/2014 |
| JP | 2016-138749 A | 8/2016 |

\* cited by examiner

SPECTROSCOPIC MEASUREMENT APPARATUS, ELECTRONIC APPARATUS, AND SPECTROSCOPIC MEASUREMENT METHOD

The present application is based on, and claims priority from, JP Application Serial Number 2018-145666, filed Aug. 2, 2018, the disclosure of which is hereby incorporated by reference herein in its entirety.

BACKGROUND

1. Technical Field

The present disclosure relates to a spectroscopic measurement apparatus, an electronic apparatus, and a spectroscopic measurement method.

2. Related Art

A spectroscopic measurement apparatus that irradiates a measurement target with light and analyzes reflected light to measure an optical spectrum is used. The spectroscopic measurement apparatus is also called as a spectrometer. JP-A-2009-236486 discloses a spectroscopic measurement apparatus. This spectroscopic measurement apparatus can measure a reflection spectrum of a measurement target including a fluorescent substance. The reflection spectrum is a spectrum of light reflected by the measurement target and the like. According to JP-A-2009-236486, the spectroscopic measurement apparatus is provided with a white light emitting diode (LED), a purple LED, and a UV LED.

Then, the white LED, the purple LED, and the UV LED were individually turned on to irradiate the measurement target with light, and the spectrum of the reflected light was measured. Moreover, the spectroscopic measurement apparatus turned on the white LED and the purple LED to irradiate the measurement target with light, and the spectrum of the reflected light was measured. Furthermore, the spectroscopic measurement apparatus turned on the white LED, the purple LED, and the UV LED to irradiate the measurement target with light, and the spectrum of the reflected light was measured. Next, the spectral data of five reflected lights was used to analyze the reflection component and the fluorescent component, and the reflection spectrum was calculated. It has become possible to miniaturize the spectroscopic measurement apparatus by using the LED instead of a light bulb as a light source.

Since the spectroscopic measurement apparatus disclosed in JP-A-2009-236486 has a large number of times of measurement, a method of lowering the number of times of measurement is disclosed in JP-A-2014-038042. In this method, the reflection spectrum is calculated in one measurement. According to the method, a light source was turned on to irradiate a measurement target with light, and a spectrum of the reflected light was measured. Next, the reflection spectrum was calculated by converting the data array indicating the spectrum of the reflected light into a vector form and multiplying the data by an estimation matrix as a transformation matrix. This transformation matrix is data in a matrix form for estimating the data of the spectrum measured by a spectrophotometer using the data of the spectrum measured by the spectroscopic measurement apparatus. The spectrophotometer can perform highly accurate spectrometry with a more complicated configuration than the spectroscopic measurement apparatus. The spectrophotometer is an apparatus capable of measuring a light intensity of each wavelength with higher accuracy than the spectroscopic measurement apparatus. The transformation matrix is data calculated by measuring a plurality of reference reflecting plates before measuring the spectrum of the reflected light.

The spectroscopic measurement apparatus is provided with a spectroscopic element which disperses light and a light receiving element which receives light and converts the light into an electric signal. The spectroscopic element has spectral characteristics, and the light receiving element has light receiving characteristics. On the other hand, the light intensity at a predetermined wavelength is more accurate for the value measured by the spectrophotometer than the value measured by the spectroscopic measurement apparatus. Therefore, the data array of the measurement result is multiplied by the transformation matrix to approximate the measurement result measured by the spectrophotometer.

In the spectrometer of JP-A-2014-038042, it is necessary that all measurement data in the measurement range is present. FIG. 27 is a graph showing an example of a spectrum of a light source in the example of the related art. A white LED and a UV LED are used for this light source. In this light source, the intensity of light is reduced at a wavelength from 400 nm to 430 nm. FIG. 28 is a graph showing an example of a spectrum of reflectance in the example of the related art. A light source having light emission characteristics of the spectrum shown in FIG. 27 is used for this spectrum of the reflectance. As shown in FIG. 28, the reflectance is abnormally high in a wavelength band from 400 nm to 430 nm where the intensity of the light emitted from the light source is reduced. The light receiving portion cannot measure the light reception amount in the wavelength band where the light to be irradiated is weak. For this reason, the calculation result of the reflectance is abnormal because the measurement data does not exist.

When multiplying the transformation matrix, the influence of the portion of the wavelength band where the measurement data does not exist exerts on other wavelength bands. Therefore, there has been a demand for a spectroscopic measurement apparatus that can measure reflectance with high accuracy by eliminating a range in which light reception amount is not detected in the measured wavelength range.

SUMMARY

A spectroscopic measurement apparatus according to the present disclosure includes a light emitting portion simultaneously emitting light including light having all wavelengths in a wavelength range from 400 nm to 700 nm to a measurement target, a light dispersing portion dispersing a reflected light reflected by the measurement target to a predetermined wavelength, a light receiving portion that receives the light dispersed by the light dispersing portion and outputs a second light reception amount indicating a light intensity of the received light to the measurement target, and a calculation unit that receives the second light reception amount of each wavelength and calculates a reflection spectrum when the measurement target is irradiated with light in which the calculation unit calculates reflectance of a predetermined wavelength using the second light reception amounts of a plurality of wavelengths.

In the spectroscopic measurement apparatus, when an intensity of the light which is dispersed from the reflected light emitted from the light emitting portion to a standard substrate and reflected by the light dispersing portion and is received by the light receiving portion is a first light reception amount, and a matrix for estimating, from the measurement reflectance spectrum measured by the spectroscopic measurement apparatus, a reference reflectance spectrum measured by a reference spectroscopic measurement apparatus is a transformation matrix, the calculation unit may receive the first light reception amount from the light receiving portion, divide the second light reception amount of each wavelength by the first light reception amount to calculate the reflectance, calculate the measurement reflectance spectrum from the reflectance of a plurality of wavelengths, and perform calculation to estimate the reference reflectance spectrum using the transformation matrix.

In the spectroscopic measurement apparatus, the light emitting portion may be configured of a plurality of LEDs, and the light emitting portion may include a first light source emitting light including light having all wavelengths in a wavelength range from 400 nm to 430 nm, and a second light source emitting light including light having all wavelengths in a wavelength range from 430 nm to 700 nm.

In the spectroscopic measurement apparatus, the first light source may be a purple LED, and the second light source may be a white LED.

In the spectroscopic measurement apparatus, the light emitting portion may include a third light source emitting light including light having all wavelengths in the wavelength range from 400 nm to 700 nm.

In the spectroscopic measurement apparatus, the third light source may be a purple white LED.

In the spectroscopic measurement apparatus, the light emitting portion may include a fourth light source emitting the light including light having all wavelengths in the wavelength range from 360 nm to 400 nm.

In the spectroscopic measurement apparatus, the fourth light source may be a UV LED.

In the spectroscopic measurement apparatus, the LEDs provided in the light emitting portion may be chip type LEDs.

An electronic apparatus according to the present disclosure includes the above-described spectroscopic measurement apparatus.

A spectroscopic measurement method according to the present disclosure includes setting a transformation matrix using a reference reflectance spectrum measured by a reference spectroscopic measurement apparatus and a measurement reflectance spectrum measured by a spectroscopic measurement apparatus, simultaneously emitting light including light having all wavelengths in a wavelength range from 400 nm to 700 nm to a standard substrate using the spectroscopic measurement apparatus, dispersing light having a wavelength in a wavelength range from 400 nm to 700 nm from reflected light reflected by the standard substrate, outputting a first light reception amount which is a light reception amount indicating a light intensity of the light received by receiving the dispersed light, simultaneously emitting the light including light having all wavelengths in a wavelength range from 400 nm to 700 nm to a measurement target, dispersing light having a wavelength in a wavelength range from 400 nm to 700 nm from reflected light reflected by the measurement target, outputting a second light reception amount which is a light reception amount indicating the light intensity of the light received by receiving the dispersed light, and calculating reflectance by dividing the second light reception amount at each wavelength by the first light reception amount and performing calculation to estimate the reference reflectance spectrum using the transformation matrix.

DESCRIPTION OF EXEMPLARY EMBODIMENTS

Hereinafter, embodiments will be described with reference to the drawings. Each member in each drawing is illustrated with different scales for each member in order to make the size recognizable in each drawing.

First Embodiment

Figure 1:
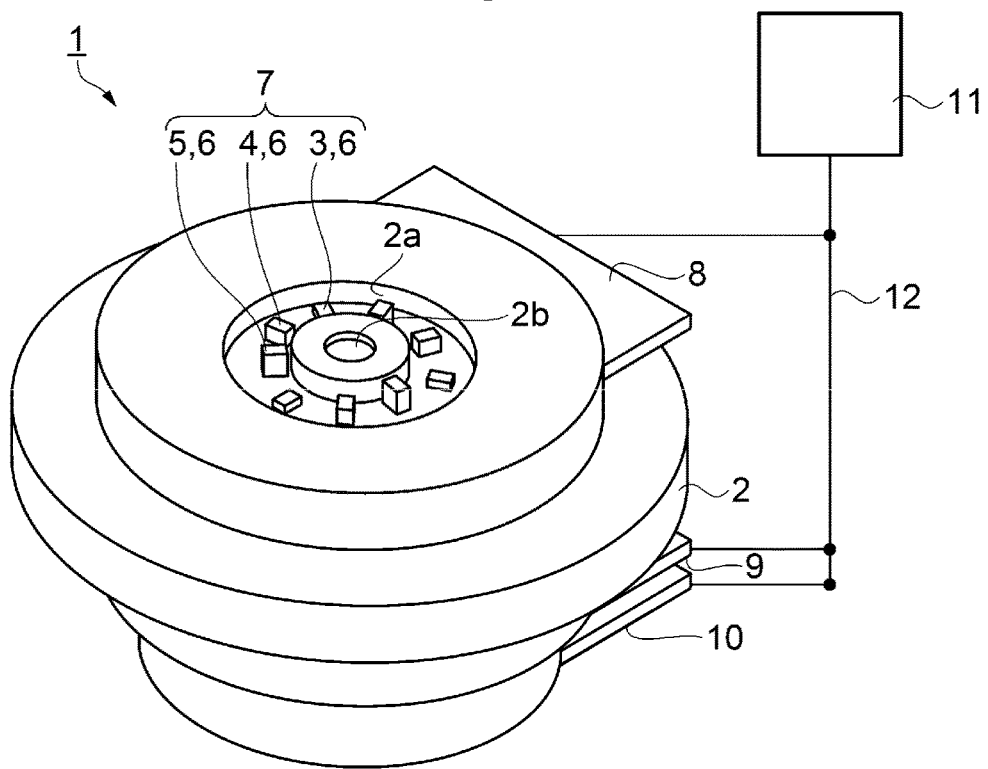
FIG. 1 is a schematic perspective diagram showing a structure of a spectroscopic measurement apparatus according to a first embodiment.

In the present embodiment, characteristic examples of a spectroscopic measurement apparatus will be described with reference to the drawings. The spectroscopic measurement apparatus according to a first embodiment will be explained according to FIGS. 1 to 8. FIG. 1 is a schematic perspective diagram showing a structure of the spectroscopic measurement apparatus. As shown in FIG. 1, a spectroscopic measurement apparatus 1 includes a cylindrical housing 2. A first opening portion 2a is provided in the housing 2, and a second light emitting element 3 as a second light source, a first light emitting element 4 as a first light source, and a fourth light emitting element 5 as a fourth light source are exposed in the first opening portion 2a. The second light emitting element 3, the first light emitting element 4, and the fourth light emitting element 5 are light emitting elements 6 having different outer shapes. The light emitting element 6 emits light toward a measurement target (not shown). A light emitting portion 7 is configured of the second light emitting element 3, the first light emitting element 4, and the fourth light emitting element 5. In other words, the light emitting portion 7 includes the second light emitting element 3, the first light emitting element 4, and the fourth light emitting element 5.

A plurality of types of light emitting elements 6 are configured of three types of light emitting elements 6 with different wavelength distribution for emitting light. In order to measure color, the measurement target may be irradiated with light having wavelengths in the entire visible range. The wavelength distribution of light emitted from one type of light emitting element 6 is often limited in the wavelength range. Also in this case, by irradiating with light from three or more types of light emitting elements 6 with different wavelength distributions, the measurement target can be irradiated with light having a wavelength distribution close to natural light. Therefore, light emitting elements 6 with three or more types of wavelength distribution may be provided.

The configuration of each light emitting element 6 is not particularly limited, but in the present embodiment, for example, the first light emitting element 4 is a purple light emitting diode (LED). The first light emitting element 4 emits light including light having all wavelengths in the wavelength range from 400 nm to 430 nm. The second light emitting element 3 is a white LED. The second light emitting element 3 emits light including light having all wavelengths in the wavelength range from 430 nm to 700 nm. The fourth light emitting element 5 is a UV LED. The fourth light emitting element 5 emits light including light having all wavelengths in the wavelength range from 360 nm to 400 nm. The light emitting portion 7 is configured of a plurality of LEDs.

When the first light emitting element 4 and the second light emitting element 3 are turned on, the light emitting portion 7 simultaneously emits light including light having all wavelengths from 400 nm to 700 nm to the measurement target.

The light emitting portion 7 includes the first light emitting element 4 and the second light emitting element 3. When the first light emitting element 4 and the second light emitting element 3 are simultaneously turned on, the light including light having all wavelengths in a wavelength range from 400 nm to 700 nm can be simultaneously emitted to the measurement target. When the fourth light emitting element 5 is turned on, the light including light having all wavelengths in the wavelength range from 360 nm to 400 nm can be simultaneously emitted to the measurement target. Then, when the light emitting portion 7 simultaneously turns on the first light emitting element 4, the second light emitting element 3, and the fourth light emitting element 5, the measurement target can be irradiated with light including light having all wavelengths in a wavelength range from 360 nm to 700 nm. When simultaneously performing irradiation of the second light emitting element 3, the first light emitting element 4, and the fourth light emitting element 5, the light emitting portion 7 can emit light close to natural light.

A second opening portion 2b is provided in the vicinity of the axis of the cylindrical housing 2. The spectroscopic measurement apparatus 1 detects light passed through the second opening portion 2b among the light reflected by the measurement target.

A first substrate 8, a second substrate 9, and a third substrate 10 protrude from a side surface of the cylindrical housing 2. The first substrate 8, the second substrate 9, and the third substrate 10 are electrically coupled to a first control unit 11 by a wiring 12.

Figure 2:
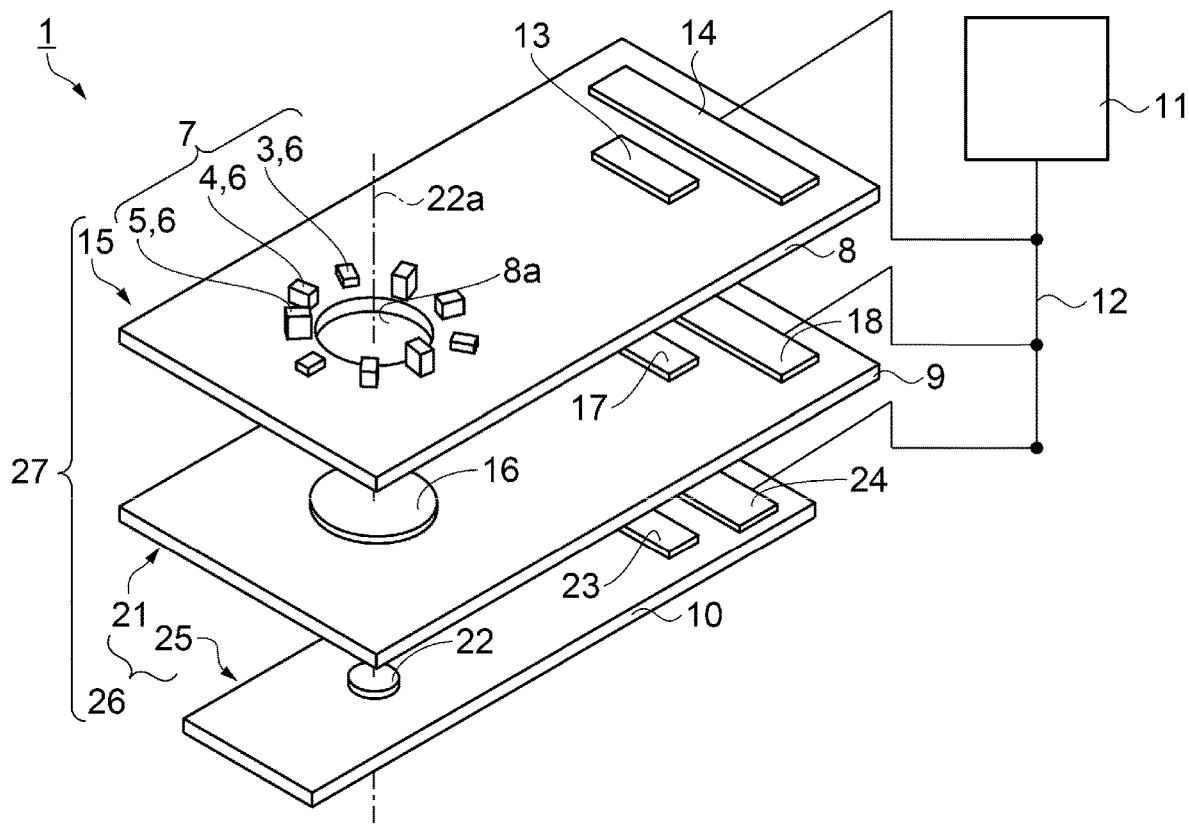
FIG. 2 is a schematic perspective diagram showing a configuration of a substrate.

FIG. 2 is a schematic perspective diagram showing a configuration of a substrate in which the housing 2 is removed from the spectroscopic measurement apparatus 1. As shown in FIG. 2, the first substrate 8 is provided with the second light emitting element 3, the first light emitting element 4, and the fourth light emitting element 5. The first substrate 8 is provided with a hole 8a, and the second light emitting element 3, the first light emitting element 4, and the fourth light emitting element 5 are disposed so as to surround the hole 8a.

The first substrate 8 is provided with a switch circuit 13 and a first connector 14. The second light emitting element 3, the first light emitting element 4, and the fourth light emitting element 5 are electrically coupled to the switch circuit 13 by a wiring (not shown). Moreover, the switch circuit 13 is electrically coupled to the first connector 14. The first connector 14 is electrically coupled to the first control unit 11 by the wiring 12.

Chip type LEDs are used for the second light emitting element 3, the first light emitting element 4, and the fourth light emitting element 5 of the light emitting portion 7. The chip type LED is also called as a surface mount type LED. Since the chip type LED is thin, it can be mounted at the surface of the first substrate 8. Moreover, since the chip type LED can be mounted in the same process as a chip resistor and a chip transistor, it can be mounted at the first substrate 8 with high productivity. In addition, the chip type LED is smaller than a filament lamp or a shell type LED. Therefore, the spectroscopic measurement apparatus 1 can be miniaturized by using the chip type LED.

The first control unit 11 outputs electric power and a control signal to the switch circuit 13. The control signal is a signal instructing turning on and turning off of the light emitting element 6. When the switch circuit 13 receives a control signal instructing to turn on the light emitting element 6, the switch circuit 13 supplies electric power to the light emitting element 6. When the switch circuit 13 receives a control signal instructing to turn off the light emitting element 6, the supply of electric power to the light emitting element 6 is stopped. Therefore, the light emitting element 6 is turned on and turned off according to the control signal output by the first control unit 11. A light source unit 15 is configured of the first substrate 8, the light emitting element 6, the switch circuit 13, and the like.

The second substrate 9 is provided with a wavelength variable filter 16, a filter drive circuit 17, and a second connector 18. The wavelength variable filter 16 is electrically coupled to the filter drive circuit 17 by a wiring (not shown). The filter drive circuit 17 is electrically coupled to the second connector 18 by a wiring (not shown). The wavelength variable filter 16 is a wavelength variable Fabry-Perot etalon. The wavelength variable Fabry-Perot etalon is a small wavelength variable filter 16. Therefore, the spectroscopic measurement apparatus 1 can be miniaturized. The filter drive circuit 17 is a circuit for driving the wavelength variable filter 16. The filter drive circuit 17 controls the wavelength of the light passing through the wavelength variable filter 16.

The filter drive circuit 17 is electrically coupled to the second connector 18. Then, the second connector 18 is electrically coupled to the first control unit 11 by the wiring 12. The first control unit 11 outputs a control signal to the filter drive circuit 17. The control signal is a signal that instructs the wavelength of the light passing through the wavelength variable filter 16. The filter drive circuit 17 controls the wavelength passing through the wavelength variable filter 16 according to the control signal. A filter unit 21 as a light dispersing portion is configured of the wavelength variable filter 16, the filter drive circuit 17, the second substrate 9, and the like. The wavelength variable filter 16 disperses the reflected light reflected by the measurement target to predetermined wavelengths.

The third substrate 10 is provided with a light receiving element 22, a light receiving element drive circuit 23, and a third connector 24. The light receiving element 22 is electrically coupled to the light receiving element drive circuit 23. The light receiving element drive circuit 23 is electrically coupled to the third connector 24. Then, the third connector 24 is electrically coupled to the first control unit 11 by the wiring 12. The light receiving element 22 detects the intensity of incident light. Then, a voltage signal corresponding to the intensity of light is output. A silicon photodiode or a photo integrated circuit (IC) can be used as the light receiving element 22. The light receiving element 22 may be a point sensor having one light receiving portion, or may be a line sensor in which a number of light receiving portions are arranged or an area sensor. In the present embodiment, for example, the light receiving element 22 is a point sensor having one light receiving portion.

The light receiving element drive circuit 23 is a circuit for driving the light receiving element 22. The light receiving element drive circuit 23 supplies electric power to the light receiving element 22, receives the voltage signal output from the light receiving element 22, and converts it into a digital signal. Then, the light receiving element drive circuit 23 outputs a digital signal indicating the intensity of light to the first control unit 11. The first control unit 11 receives the digital signal output from the light receiving element drive circuit 23 at the timing when the adjustment of the wavelength of light passing through the wavelength variable filter 16 is finished. Therefore, the first control unit 11 can detect the intensity of light having a specific wavelength with high quality.

A light receiving unit 25 as a light receiving portion is configured by the light receiving element 22, the light receiving element drive circuit 23, the third substrate 10, and the like. The light receiving unit 25 receives the light dispersed by the filter unit 21 and outputs data of light reception amount indicating the amount of light to the first control unit 11. A light receiver 26 is configured by the filter unit 21 and the light receiving unit 25. The filter unit 21 includes a wavelength variable Fabry-Perot etalon, so that the light receiver 26 includes a wavelength variable Fabry-Perot etalon. A sensor unit 27 is configured by the light receiver 26 and the light source unit 15.

The light receiving element 22 has an optical axis 22a indicating the direction in which the sensitivity is high in the light reception sensitivity distribution. The hole 8a and the wavelength variable filter 16 are installed at potions where the optical axis 22a passes.

Figure 3:
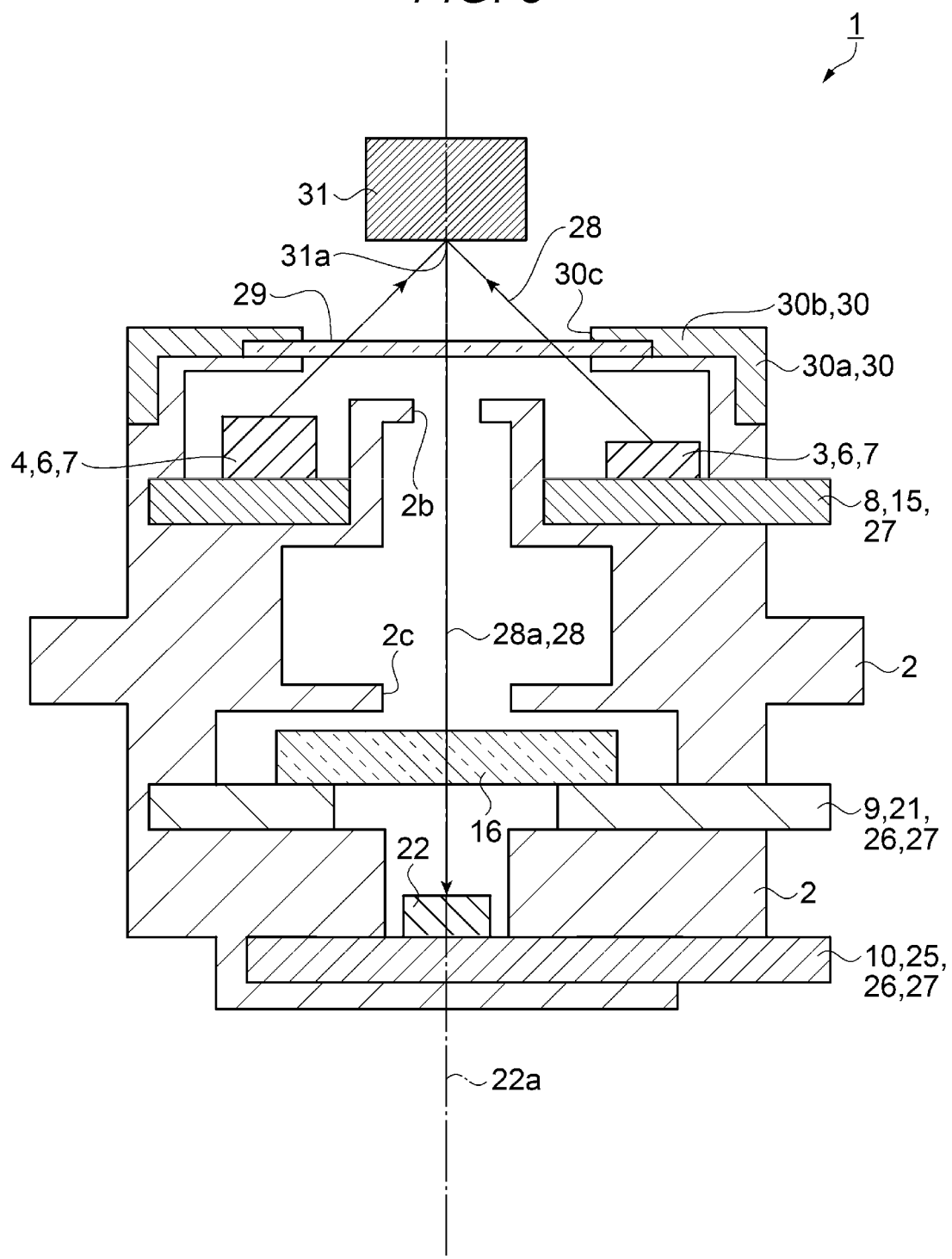
FIG. 3 is a schematic side sectional diagram showing a structure of the spectroscopic measurement apparatus.

FIG. 3 is a schematic side sectional diagram showing a structure of the spectroscopic measurement apparatus. As shown in FIG. 3, the first substrate 8, the second substrate 9, and the third substrate 10 are disposed at intervals in the direction of the optical axis 22a. A portion of the housing 2 is provided between the first substrate 8 and the second substrate 9, and a portion of the housing 2 is also provided between the second substrate 9 and the third substrate 10. The housing 2 has a structure in which a plurality of portions are assembled.

In the spectroscopic measurement apparatus 1, a protection portion 29 with optical transparency is provided on a side where the light emitting element 6 emits light 28. The light emitting element 6 emits the light 28 toward a measurement target 31. The protection portion 29 is located between the light emitting element 6 and the measurement target 31. Dust and moisture particles may float in the vicinity of the measurement target 31. Here, the protection portion 29 suppresses adhesion of dust and moisture particles to the light emitting element 6 and the light receiver 26.

The protection portion 29 is a filter that limits the wavelength of the light 28 to be passed through. For example, when the spectroscopic measurement apparatus 1 performs spectral reflection measurement in the visible light wavelength region, the protection portion 29 uses a filter that passes through the light 28 limited to the visible light wavelength region. The wavelength characteristics of the light 28 transmitted by the protection portion 29 are not particularly limited. However, in the present embodiment, for example, the protection portion 29 transmits the light 28 having a wavelength from 350 nm to 700 nm. Then, the protection portion 29 does not transmit the light 28 having a wavelength less than 350 nm and the light 28 having a wavelength more than 700 nm. Accordingly, the protection portion 29 can suppress the light 28 having a wavelength other than the light receiver 26 wants to receive to advance to the light receiver 26. Since the light 28 having the wavelength not to be measured, such as near-infrared light, becomes a noise component, highly accurate measurement can be performed by preventing the near-infrared light from passing through the protection portion 29.

The protection portion 29 is adhesively fixed to a support portion 30. The support portion 30 has a shape in which a cylindrical outer peripheral portion 30a and a disk-like top plate portion 30b are joined. An opening portion 30c is provided in the top plate portion 30b, and the protection portion 29 is provided in the opening portion 30c. The outer peripheral portion 30a is inserted into the housing 2 and can be removed from the housing 2. Moreover, the protection portion 29 is detachably attached to the housing 2 by the support portion 30. Therefore, even when dust and moisture particles adhere to the protection portion 29, the protection portion 29 can be removed from the spectroscopic measurement apparatus 1 to wipe off dust and moisture particles. Then, the cleaned protection portion 29 can be reinstalled in the spectroscopic measurement apparatus 1. Therefore, the protection portion 29 can be easily repaired.

The spectroscopic measurement apparatus 1 is used in a state in which the measurement target 31 is placed at a position on the optical axis 22a of the light receiving element 22. Then, the measurement target 31 is disposed at a position where the distance from the protection portion 29 is a predetermined distance. The measurement target 31 is irradiated with the light 28 emitted from the light emitting element 6. The light 28 is irregularly reflected on the surface of the measurement target 31. The surface of the measurement target 31 on the optical axis 22a is taken as an observation point 31a. The spectroscopic measurement apparatus 1 analyzes the light 28 reflected at the observation point 31a.

A portion of the light 28 reflected on the surface of the measurement target 31 passes through the protection portion 29. The protection portion 29 removes infrared light. A portion of the light 28 passed through the protection portion 29 reaches the wavelength variable filter 16. The wavelength variable filter 16 passes the light 28 having a specific wavelength. The wavelength of the light 28 to be passed through is controlled by the first control unit 11.

The second opening portion 2b and the third opening portion 2c are provided between the protection portion 29 and the wavelength variable filter 16. The second opening portion 2b and the third opening portion 2c are parts of the housing 2. The second opening portion 2b and the third opening portion 2c function as a stop for advancing only the light 28 reflected by the measurement target 31 to the light receiving element 22.

The light receiving element 22 is irradiated with the light 28 passed through the wavelength variable filter 16. Then, the light receiving element 22 detects the intensity of the light 28 irradiated with and outputs it to the light receiving element drive circuit 23. In this way, the light receiver 26 receives the light 28. When the light emitting portion 7 irradiates the measurement target 31 with the light 28, and the light receiver 26 receives reflected light 28a reflected by the measurement target 31, the light reception amount of the received light 28 is taken as a second light reception amount. Moreover, when the light emitting portion 7 irradiates a first standard plate with the light 28, and the light receiver 26 receives the reflected light 28a of the light 28 reflected by the first standard plate, the light reception amount of the received light 28 is taken as a first light reception amount. The first standard plate is a tile, an enamel, or the like, and has a white glazed baked surface. The first standard plate reflects the light 28 including a wavelength from 400 nm to 700 nm.

Figure 4:
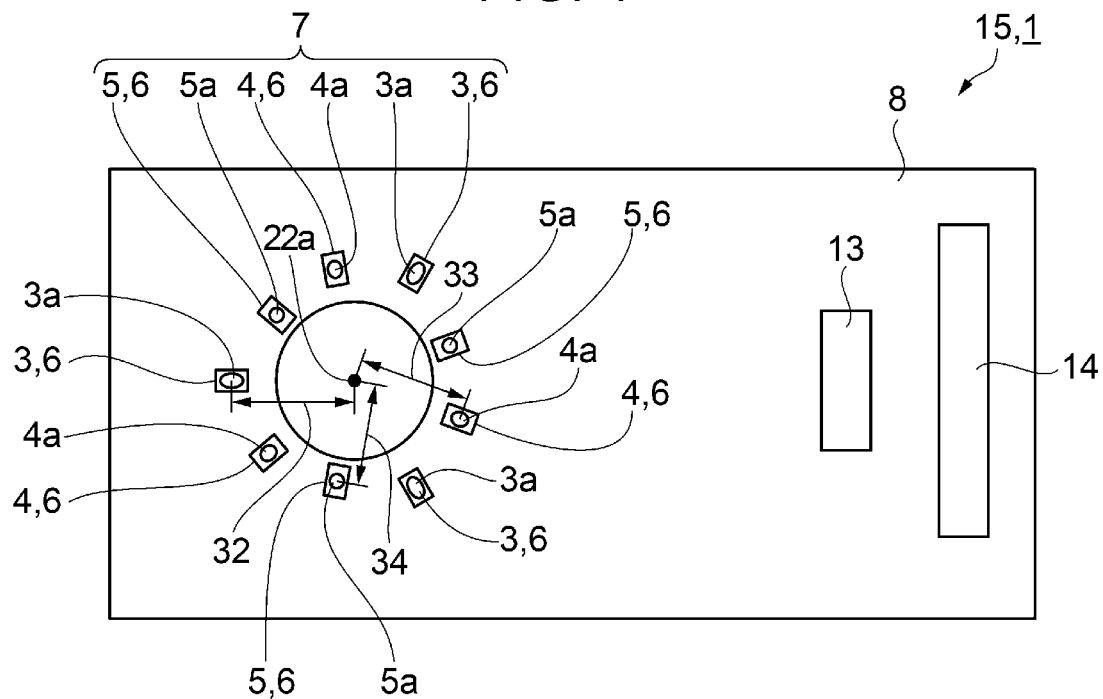
FIG. 4 is a schematic plan diagram showing a configuration of a light source unit.
Figure 5:
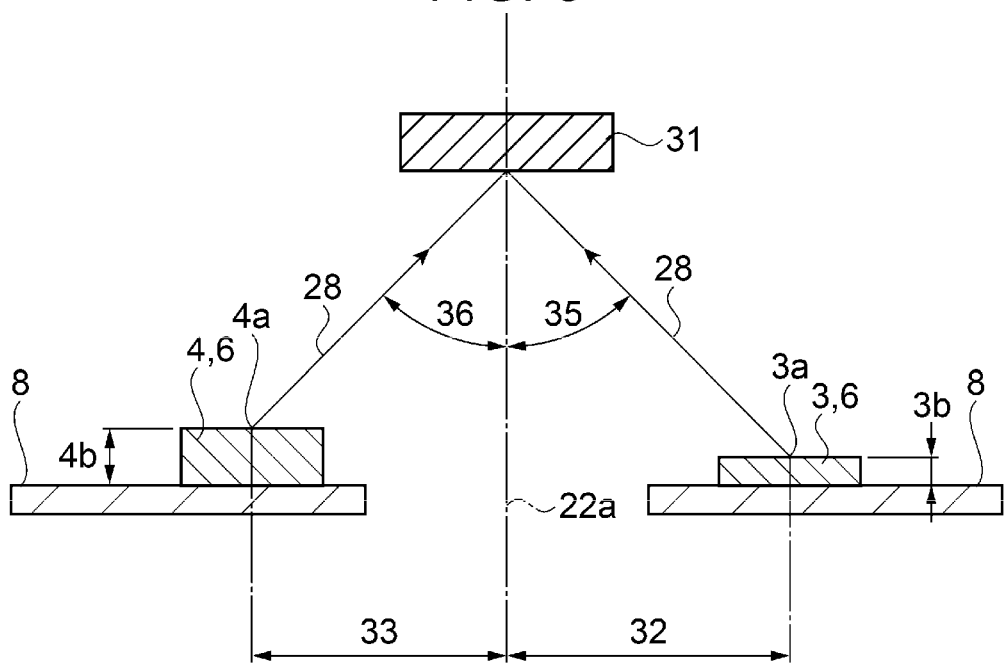
FIG. 5 is a schematic side sectional diagram for explaining a relative position of a light emitting element.
Figure 6:
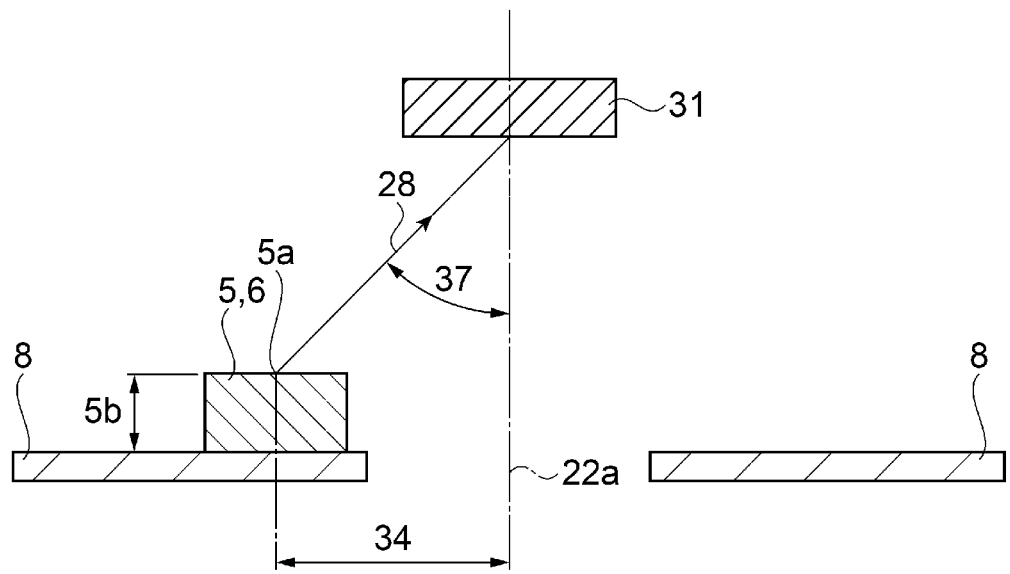
FIG. 6 is a schematic side sectional diagram for explaining the relative position of the light emitting element.

FIG. 4 is a schematic plan diagram showing a configuration of a light source unit. FIGS. 5 and 6 are schematic side sectional diagrams for explaining relative positions of a light emitting element. As shown in FIG. 4, the first substrate 8 is provided with three types of light emitting elements 6 of the second light emitting element 3, the first light emitting element 4, and the fourth light emitting element 5. That is, the first substrate 8 is provided with a plurality of types of light emitting elements 6. The portions from the second light emitting element 3, the first light emitting element 4, and the fourth light emitting element 5 which emit the light 28 are taken as a second light emitting portion 3a, a first light emitting portion 4a, and a fourth light emitting portion 5a, respectively. The second light emitting portion 3a, the first light emitting portion 4a, and the fourth light emitting portion 5a correspond to the light emitting portion 7.

The first substrate 8 is provided with three second light emitting elements 3. In the second light emitting element 3, the distance between the optical axis 22a and the second light emitting portion 3a is taken as a second distance 32. In the first light emitting element 4, the distance between the optical axis 22a and the first light emitting portion 4a is taken as a first distance 33. In the fourth light emitting element 5, the distance between the optical axis 22a and the fourth light emitting portion 5a is taken as a fourth distance 34.

The second light emitting element 3, the first light emitting element 4, and the fourth light emitting element 5 are repeatedly disposed in this order in a counterclockwise direction around the optical axis 22a in this order on the first substrate 8. The angle between the adjacent light emitting element 6 and the optical axis 22a is 40 degrees. Therefore, the light emitting elements 6 are arranged at equal angles.

When the surface of the measurement target 31 has unevenness, the intensity and spectrum of the reflected light 28 differ depending on the direction in which the light 28 is emitted. In the spectroscopic measurement apparatus 1, the second light emitting element 3, the first light emitting element 4, and the fourth light emitting element 5 respectively emit the light 28 from three directions. Therefore, even when the surface of the measurement target 31 has unevenness, the measurement accuracy of the spectrum detected by the spectroscopic measurement apparatus 1 can be improved.

As shown in FIGS. 5 and 6, the height from the first substrate 8 to the second light emitting portion 3a is taken as a second light emitting portion height 3b. The height from the first substrate 8 to the first light emitting portion 4a is taken as a first light emitting portion height 4b. The first light emitting portion height 4b is higher than the second light emitting portion height 3b. As described above, the first substrate 8 is provided with the light emitting element 6 having the first light emitting portion height 4b different from the second light emitting portion height 3b. The first light emitting element 4 having the high first light emitting portion height 4b is provided at a position closer to the optical axis 22a than the second light emitting element 3 having the low second light emitting portion height 3b.

The height from the first substrate 8 to the fourth light emitting portion 5a is taken as a fourth light emitting portion height 5b as a light emitting portion height. The fourth light emitting portion height 5b is higher than the first light emitting portion height 4b. As described above, the first substrate 8 is provided with the light emitting element 6 having the fourth light emitting portion height 5b different from the second light emitting portion height 3b and the first light emitting portion height 4b.

The fourth light emitting portion 5 having the high fourth light emitting portion height 5b is provided at a position closer to the optical axis 22a than the first light emitting element 4 having the low first light emitting portion height 4b. The second light emitting portion height 3b, the first light emitting portion height 4b, and the fourth light emitting portion height 5b are taken as the light emitting portion height. Here, the first substrate 8 is provided with a plurality of types of light emitting elements 6 having different light emitting portion heights. Then, the light emitting element 6 having the high light emitting portion height is placed at a position closer to the optical axis 22a of the light 28 received by the light receiver 26 than the light emitting element 6 having the low light emitting portion height.

The angle between the light 28 traveling from the second light emitting portion 3a of the second light emitting element 3 to the observation point 31a of the measurement target 31 on the optical axis 22a and the optical axis 22a is taken as a second angle 35. The angle between the light 28 traveling from the first light emitting portion 4a of the first light emitting element 4 to the observation point 31a of the measurement target 31 on the optical axis 22a and the optical axis 22a is taken as a first angle 36. The angle between the light 28 traveling from the fourth light emitting portion 5a of the fourth light emitting element 5 to the observation point 31a of the measurement target 31 on the optical axis 22a and the optical axis 22a is taken as a fourth angle 37.

The second angle 35, the first angle 36, and the fourth angle 37 are the same angle. That is, the angle between the light 28 traveling from the plurality of types of light emitting elements 6 to the measurement target 31 on the optical axis 22a of the light 28 received by the light receiver 26 and the optical axis 22a is the same. Here, when the light receiver 26 receives the light 28 emitted to the measurement target 31, the light emitted from the plurality of types of light emitting elements 6 can be received in the same reflection state.

The second angle 35, the first angle 36, and the fourth angle 37 are 45 degrees. That is, the angle between the light 28 traveling from the plurality of types of light emitting elements 6 to the measurement target 31 on the optical axis 22a and the optical axis 22a is 45 degrees. Here, the light receiver 26 can receive the light 28 in which a regular reflection component is removed from the light reflected by the measurement target 31.

Figure 7:
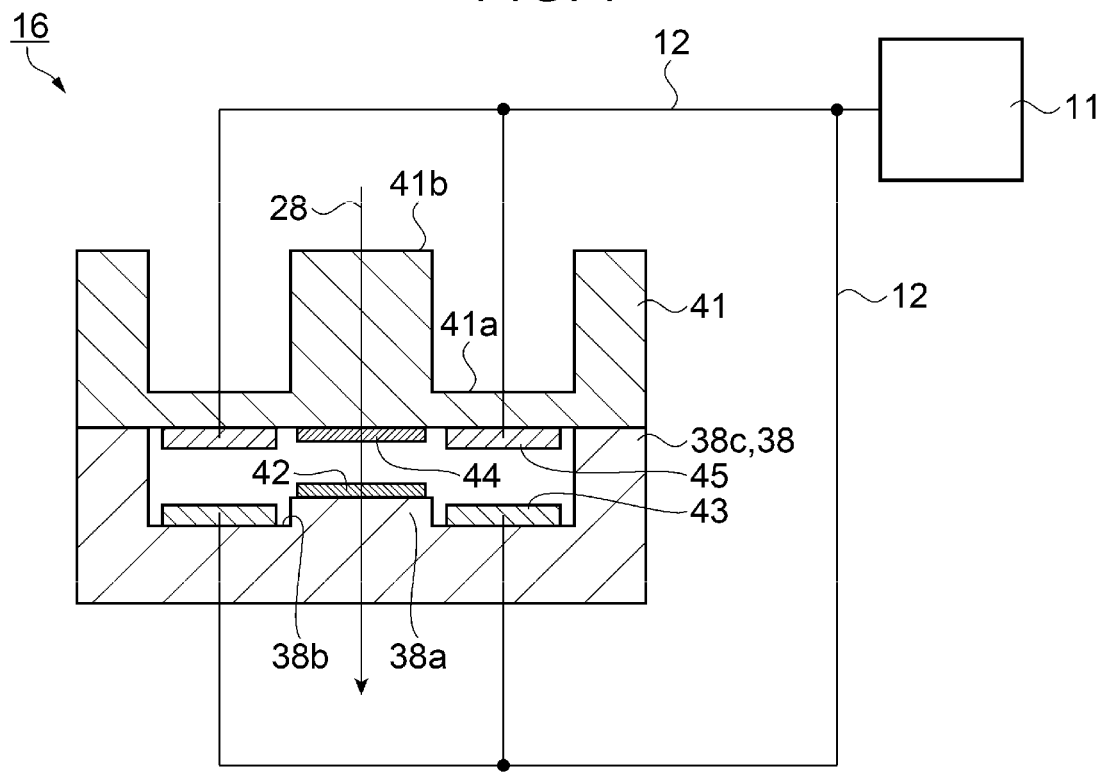
FIG. 7 is a schematic side sectional diagram showing a structure of a wavelength variable filter.

FIG. 7 is a schematic side sectional diagram showing a structure of a wavelength variable filter. As shown in FIG. 7, the wavelength variable filter 16 is provided with a fixed substrate 38 and a movable substrate 41. The fixed substrate 38 has a rectangular plate shape. A reflective film mounting portion 38a protruding in a cylindrical shape is provided at the center of the fixed substrate 38. An electrode installation groove 38b recessed in an annular shape is provided so as to surround the reflective film mounting portion 38a. A first joining portion 38c protruding toward the movable substrate 41 side is provided around the electrode installation groove 38b. The first joining portion 38c is a portion to be joined with the movable substrate 41.

A material of the fixed substrate 38 is a material that transmits the light 28, and is not particularly limited as long as it has strength. Silicate glass is used as a material for the fixed substrate 38.

The reflective film mounting portion 38a is provided with a first reflective film 42. The electrode installation groove 38b is provided with a first electrode 43. The first electrode 43 has an annular shape.

The movable substrate 41 is provided with an annular groove 41a surrounding the center. A cylindrical portion surrounded by the groove 41a is taken as a movable portion 41b. The movable portion 41b is disposed to face the reflective film mounting portion 38a of the fixed substrate 38. Since the thickness of the movable substrate 41 is thin at the portion of the groove 41a, the movable portion 41b can be easily moved in the vertical direction in FIG. 7. A material of the movable substrate 41 is a material that transmits the light 28, and is not particularly limited as long as it has strength. Silicate glass is used as a material of the movable substrate 41.

The surface of the movable portion 41b at the fixed substrate 38 side is provided with a second reflective film 44. The first reflective film 42 and the second reflective film 44 are disposed to face each other. The surface of the movable substrate 41 at the fixed substrate 38 side is provided with a second electrode 45. The first electrode 43 and the second electrode 45 are disposed to face each other.

The first electrode 43 and the second electrode 45 are electrically coupled to the first control unit 11 by the wiring 12. The first control unit 11 controls a voltage applied between the first electrode 43 and the second electrode 45. Electrostatic force applied between the first electrode 43 and the second electrode 45 changes by changing the voltage between the first electrode 43 and the second electrode 45. Then, the first control unit 11 controls the distance between the first reflective film 42 and the second reflective film 44 by controlling the voltage applied between the first electrode 43 and the second electrode 45.

By controlling the distance between the first reflective film 42 and the second reflective film 44, it is possible to control the half-width of the wavelength of the light 28 transmitted through the first reflective film 42 and the second reflective film 44. The thickness of the wavelength variable filter 16 is 2 mm or less. By using the wavelength variable filter 16, the spectroscopic measurement apparatus 1 can be miniaturized.

Figure 8:
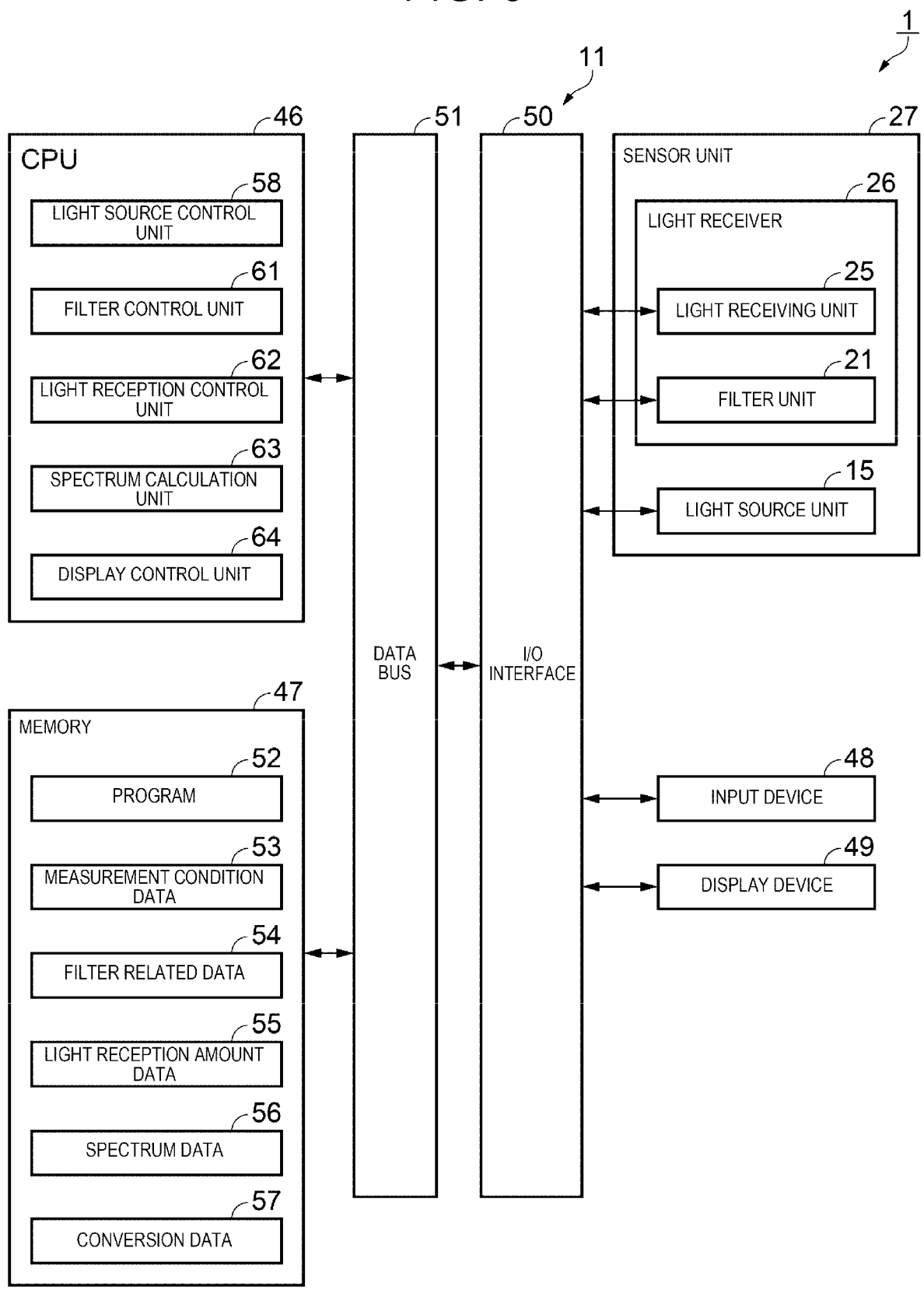
FIG. 8 is an electric control block diagram of the spectroscopic measurement apparatus.

FIG. 8 is an electric control block diagram of the spectroscopic measurement apparatus. In FIG. 8, the spectroscopic measurement apparatus 1 includes the first control unit 11 that controls the operation of the spectroscopic measurement apparatus 1. The first control unit 11 includes a central processing unit (CPU) 46 that performs various arithmetic processes as a processor and a memory 47 that stores various information. The light receiving unit 25, the filter unit 21, the light source unit 15, an input device 48, and a display device 49 are connected to the CPU 46 via an I/O interface 50 and a data bus 51.

The sensor unit 27 includes the light receiver 26 and the light source unit 15. The light receiver 26 includes the light receiving unit 25 and the filter unit 21. The light source unit 15 receives instruction signal of the CPU 46. The instruction signal includes information on whether the light source unit 15 emits the light 28 or not. Then, the light source unit 15 performs switching between emission and emission stop of the light 28 based on the instruction signal.

The filter unit 21 also receives the instruction signal of the CPU 46. The instruction signal includes information on the wavelength of the light 28 that passes through the filter unit 21. Then, the filter unit 21 limits the wavelength of the light 28 to be passed through based on the instruction signal.

The light receiving unit 25 also receives the instruction signal of the CPU 46. The instruction signal includes information on whether to output the data indicating the received amount of the light 28 received by the light receiving unit 25 or not. Then, the light receiving unit 25 converts the light reception amount of the received light 28 into digital data and outputs the digital data to the CPU 46.

The input device 48 is a device such as a keyboard or a mouse. The input device 48 is a device for an operator to instruct the spectroscopic measurement apparatus 1 to start and finish the measurement, and to give various instructions such as measurement conditions. The display device 49 is a device that displays measurement results and information related to the measurement. A liquid crystal display device, an organic electroluminescence display, a plasma display, or a surface electric field display can be used as the display device 49.

The memory 47 is a concept including a semiconductor memory such as a RAM and a ROM, and an external storage device such as a hard disk. The memory 47 stores a program 52 in which the control procedure of the operation of the spectroscopic measurement apparatus 1 and the calculation procedure of the distance measurement are described. In addition, the memory 47 stores measurement condition data 53 such as an intensity of the light 28 emitted from the second light emitting element 3, the first light emitting element 4, and the fourth light emitting element 5. The measurement condition data 53 includes data indicating the relationship between the voltage output to the filter unit 21 and the wavelength of the light 28 transmitted by the filter unit 21.

The memory 47 stores filter related data 54 which is data related to the wavelength of the light 28 that the filter unit 21 passes. The memory 47 stores light reception amount data 55 which is the data of light reception amount of the light 28 received by the light receiving unit 25. The memory 47 stores spectrum data 56 indicating the relationship between the wavelength and the light reception amount of the light 28 passed through the filter unit 21. The spectrum data 56 includes data of a spectrum calculated using the light reception amount detected by irradiating the measurement target 31 with the light 28. Furthermore, the spectrum data 56 includes data of a spectrum calculated using the light reception amount detected by irradiating the standard plate with the light 28. The memory 47 stores conversion data 57 used when converting the spectrum data 56. In addition, a storage area functioning as a work area or a temporary file for the CPU 46 to operate and various other storage areas are provided.

The CPU 46 drives the sensor unit 27 according to the program 52 stored in the memory 47. Then, the CPU 46 calculates the spectrum of the light 28 reflected by the measurement target 31 and displays it on the display device 49. The first control unit 11 functions as a computer equipped with the input device 48, the display device 49, and the CPU 46. The CPU 46 in which the program 52 operates has a light source control unit 58 as a specific function realizing unit. The light source control unit 58 controls the intensity of the light 28 emitted from the second light emitting element 3, the first light emitting element 4, and the fourth light emitting element 5 using the measurement condition data 53.

The CPU 46 has a filter control unit 61. The filter control unit 61 controls the wavelength of the light 28 passing through the filter unit 21. The filter control unit 61 sequentially changes the wavelength of the light 28 passing through the filter unit 21 in a range of the wavelength to be measured.

The CPU 46 has a light reception control unit 62. The light reception control unit 62 controls the timing at which the light receiving unit 25 detects the light reception amount of the light 28. The light reception control unit 62 outputs an instruction signal causing the light receiving unit 25 to detect the intensity of the light 28 after the change of the wavelength of the light 28 to be passed through the filter unit 21 is finished. Since the light receiving unit 25 detects the light reception amount of the light 28 after the operation of the filter unit 21 is completed, the light receiving unit 25 can detect the intensity of the light 28 with high quality.

The CPU 46 has a spectrum calculation unit 63 as a calculation unit. The spectrum calculation unit 63 combines the data of the wavelength of the light 28 passed through the filter unit 21 and the data of the light reception amount of the light 28 detected by the light receiving unit 25. Then, the spectrum calculation unit 63 calculates the spectrum data 56 indicating the relation of the intensity with respect to the wavelength of the light 28.

As described above, the spectrum calculation unit 63 inputs the light reception amount of each wavelength to calculate the reflection spectrum when the measurement target 31 is irradiated with light. The reflection spectrum refers to the spectrum of the reflected light 28a obtained by irradiating an object with the light 28. The reflection spectrum obtained by measuring the reflected light 28a in which the light emitted from the light emitting portion 7 is reflected by the measurement target 31 is taken as a measurement target spectrum. The memory 47 stores data of a spectrum calculated using the first light reception amount detected by irradiating the standard plat with the light 28. The spectrum calculated using the first light reception amount detected by irradiating the standard plate with the light 28 is taken as a standard spectrum. Here, the reflectance of each wavelength of the measurement target 31 is obtained by using the measurement target spectrum and the standard spectrum. Then, the spectrum calculation unit 63 calculates the reflectance of a predetermined wavelength using the first light reception amount and the second light reception amount of a plurality of wavelengths.

The CPU 46 includes a display control unit 64. The display control unit 64 performs control to display the wavelength of the light 28 to be passed through the filter unit 21 and the light reception amount of the light 28 received by the light receiving unit 25 on the display device 49 in the form of a table. In addition, the display control unit 64 performs control to display the spectrum data 56 calculated by the spectrum calculation unit 63.

Next, an operation of calculating the reflection spectrum by the spectroscopic measurement apparatus 1 will be described. It is assumed that the spectroscopic measurement apparatus 1 measures the spectrum in the wavelength range from 400 nm to 700 nm. First, the light source control unit 58 drives the light source unit 15 to emit the light 28 from the second light emitting element 3, the first light emitting element 4, and the fourth light emitting element 5 to the measurement target 31. In advance, the data of the intensity of the light 28 emitted from the second light emitting element 3, the first light emitting element 4, and the fourth light emitting element 5 is set as a part of the measurement condition data 53 so that the spectrum of the light 28 emitted to the measurement target 31 is close to natural light. The light source control unit 58 drives the light source unit 15 using the measurement condition data 53. Accordingly, the light source unit 15 can irradiate the measurement target 31 with the light 28 brought close to natural light.

Next, the filter control unit 61 outputs an instruction signal that instructs the filter unit 21 to pass the light 28 of 400 nm. The filter unit 21 receives the instruction signal and adjusts the wavelength of the light 28 to be passed through to 400 nm. Subsequently, the light reception control unit 62 outputs an instruction signal for detecting the light reception amount of the light 28 to the light receiving unit 25. The light receiving unit 25 receives the instruction signal and detects the light reception amount of the light 28 received by the light receiving unit 25. Then, data of the light reception amount data 55 indicating the light reception amount of the light 28 is sent to the CPU 46. The light reception control unit 62 stores the light reception amount data 55 indicating the light intensity and data indicating that the wavelength of the light 28 is 400 nm in the memory 47.

Next, the filter control unit 61 outputs an instruction signal that instructs the filter unit 21 to pass the light 28 of 405 nm. The filter unit 21 receives the instruction signal and adjusts the wavelength of the light 28 to be passed through to 405 nm. Subsequently, the light reception amount of the light 28 received by the light receiving unit 25 is detected and the data of the light reception amount data 55 is sent to the CPU 46. The light reception control unit 62 stores the light reception amount data 55 indicating the light intensity and data indicating that the wavelength of the light 28 is 405 nm in the memory 47.

Next, the filter control unit 61 outputs an instruction signal to the filter unit 21 to increase the wavelength of the light 28 to be passed by 5 nm. Then, the light receiving unit 25 detects the intensity of the light 28, and the light reception control unit 62 stores the light reception amount data 55 indicating the light intensity in the memory 47.

As described above, a step of increasing the wavelength of the light 28 to be passed by 5 nm up to 700 nm, a step of detecting the intensity of the light 28 with the light receiving unit 25, and a step of storing the light reception amount data 55 and the wavelength data of the light 28 in the memory 47 are repeated.

Next, the spectrum calculation unit 63 calculates the reflection spectrum. The spectrum calculation unit 63 plots the intensity of the light 28 detected by the light receiving unit 25 on the vertical axis with the wavelength when the light receiving unit 25 detects the intensity of the light 28 as the horizontal axis. The spectrum calculation unit 63 plots the intensity of the light 28 when the wavelength of the light 28 is from 400 nm to 700 nm and ends the calculation of the reflection spectrum.

Next, FIGS. 9 to 22 will be used to describe a spectroscopic measurement method to measure a reflectance using the above-described spectroscopic measurement apparatus 1. The reflectance measurement is performed with respect to the light 28 having wavelengths from 400 nm to 700 nm. Therefore, the present method provides a spectrum of reflectance. The spectrum of reflectance is referred to as a reflectance spectrum.

Figure 9:
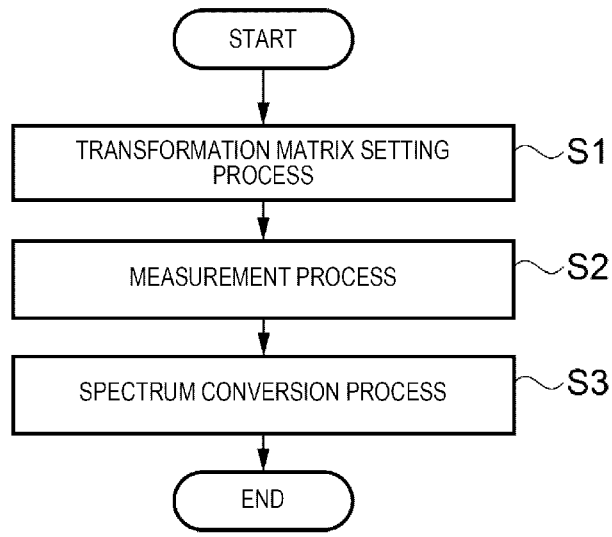
FIG. 9 is a flowchart of a spectroscopic measurement method.

FIG. 9 is a flowchart of the spectroscopic measurement method. FIGS. 10 to 22 are diagrams and graphs for explaining the spectroscopic measurement method. In the flowchart of FIG. 9, step S1 is a transformation matrix setting process. The transformation matrix is a data array in a matrix form for estimating a reference reflectance spectrum measured by a reference spectroscopic measurement apparatus 65 from a measurement reflectance spectrum measured by the spectroscopic measurement apparatus 1. This step is a step in which the spectrum calculation unit 63 calculates a transformation matrix for converting the spectrum of the reflectance measured using the spectroscopic measurement apparatus 1 into the spectrum of the reflectance measured by a multi-channel spectrophotometer. The spectrum calculation unit 63 stores the transformation matrix in the memory 47 as one piece of conversion data 57. Hereinafter, the multi-channel spectrophotometer will be referred to as a multi-spectrophotometer.

Next, the process proceeds to step S2. Step S2 is a measurement process. This process is a process of measuring the spectrum of reflectance using the spectroscopic measurement apparatus 1. Next, the process proceeds to step S3. Step S3 is a spectrum conversion process. This process is a process of calculating an estimated spectrum using the data of the spectrum of the measured reflectance and the transformation matrix. The estimated spectrum is a spectrum which estimated the reflectance measured with the multi-spectrophotometer. The spectroscopic measurement process ends with these processes.

Next, using FIGS. 10 to 22, the spectroscopic measurement method will be described in detail corresponding to the steps shown in FIG. 9.

Figure 10:
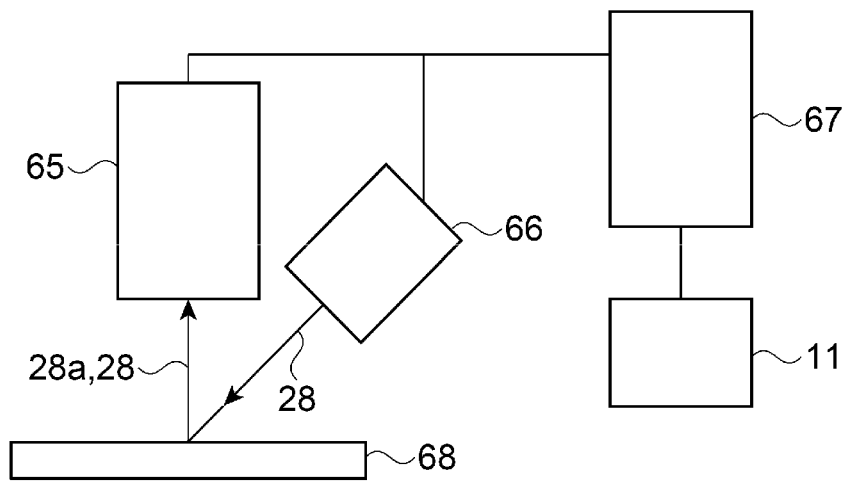
FIG. 10 is a diagram for explaining the spectroscopic measurement method.

FIGS. 10 to 15 are diagrams and graphs corresponding to the transformation matrix setting process of step S1. As shown in FIG. 10, the reference spectroscopic measurement apparatus 65 is prepared in step S1. The reference spectroscopic measurement apparatus 65 is a measurement apparatus that serves as a reference for the spectroscopic measurement. An apparatus capable of measuring the reflection spectrum with high accuracy is selected as the reference spectroscopic measurement apparatus 65. In the present embodiment, the multi-spectrophotometer is used as the reference spectroscopic measurement apparatus 65.

The multi-spectrophotometer is a measurement apparatus equipped with a special optical system capable of directly measuring a spectrum. The multi-spectrophotometer is different from the spectroscopic measurement apparatus 1 in that it can extract only light in a very narrow wavelength range. Specifically, the multi-spectrophotometer can extract light about several nm in wavelength width. The spectrum measured by the multi-spectrophotometer can measure a spectrum with high accuracy.

Even if light reception amount at a certain wavelength is measured in the spectroscopic measurement apparatus 1, the value actually obtained is a value obtained by weighting and integrating the light intensity in a certain wavelength width including the wavelength. This is due to the characteristics of the wavelength variable filter 16. The weight of the "weighted integrated value" is a function similar to a normal distribution. Such a spectrum obtained by the spectroscopic measurement apparatus 1 is referred to as a "measurement spectrum", and the spectrum measured using the reference spectroscopic measurement apparatus 65 is referred to as a "reference spectrum".

The spectrum of the reflectance obtained from the measurement spectrum is referred to as a "measurement reflectance spectrum". The spectrum of the reflectance obtained from the reference spectrum is referred to as the "reference reflectance spectrum". The transformation matrix is calculated from the measurement reflectance spectrum and the reference reflectance spectrum. It is possible to estimate the reference reflectance spectrum using the measurement reflectance spectrum and the transformation matrix. The spectrum obtained by estimating the reference reflectance spectrum is referred to as an "estimated spectrum". The transformation matrix is used for the calculation of estimating the estimated spectrum from the measurement reflectance spectrum.

The reference spectroscopic measurement apparatus 65 includes a light source 66 and a second control unit 67. An incandescent light bulb is used as the light source 66. The incandescent light bulb emits the light 28 in a wide range of wavelengths. The light 28 emitted from the incandescent light bulb is taken as standard light. A first standard plate 68 as a standard substrate is disposed at a position where the light source 66 emits the light 28.

Then, the light source 66 irradiates the first standard plate 68 with the light 28, and the light 28 is received and dispersed by the reference spectroscopic measurement apparatus 65. The reference spectroscopic measurement apparatus 65 outputs light reception amount of each wavelength in the range from 400 nm to 700 nm to the second control unit 67. The reference spectroscopic measurement apparatus 65 outputs the light reception amount of each wavelength at a wavelength interval of 5 nm from 400 nm to 700 nm. Then, the second control unit 67 calculates the reference spectrum from the light reception amount of each wavelength. The spectrum obtained by the reference spectroscopic measurement apparatus 65 measuring the first standard plate 68 is referred to as a first reference spectrum. The second control unit 67 is electrically coupled to the first control unit 11. Then, the second control unit 67 transfers the data of the first reference spectrum to the first control unit 11. The first control unit 11 stores data of the first reference spectrum in the memory 47 as one piece of spectrum data 56.

Figure 11:
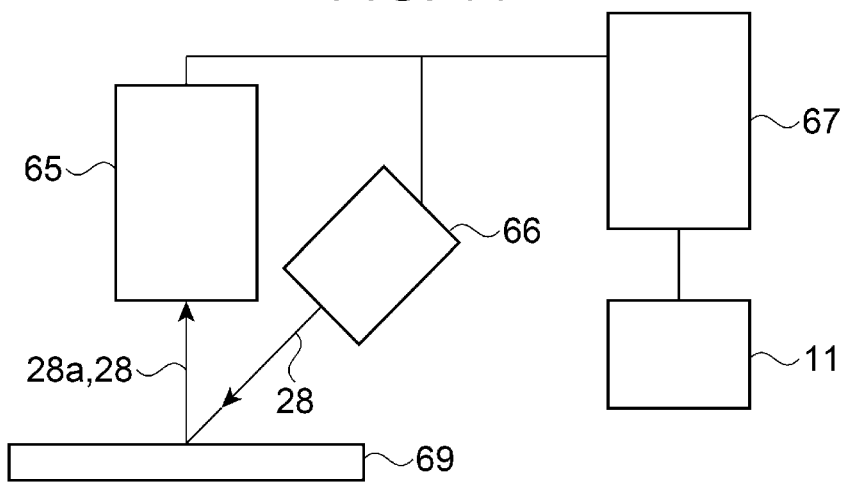
FIG. 11 is a diagram for explaining the spectroscopic measurement method.

As shown in FIG. 11, next, a second standard plate 69 is disposed at a position where the light source 66 emits the light 28. The second standard plate 69 is, like the first standard plate 68, a tile, an enamel, or the like, and has a surface obtained by baking a white glaze. Similar to the first standard plate 68, the second standard plate 69 reflects the light 28 having a wavelength from 400 nm to 700 nm. The second standard plate 69 has a color tone different from that of the first standard plate 68.

Then, the light source 66 irradiates the second standard plate 69 with the light 28, and the reflected light 28 is received and dispersed by the reference spectroscopic measurement apparatus 65. The reference spectroscopic measurement apparatus 65 outputs the light reception amount of each wavelength at a wavelength interval of 5 nm from 400 nm to 700 nm to the second control unit 67. Then, the second control unit 67 calculates the reference spectrum from the light reception amount of each wavelength. The spectrum obtained by the reference spectroscopic measurement apparatus 65 measuring the second standard plate 69 is referred to as a second reference spectrum. The first reference spectrum and the second reference spectrum have different distributions. Then, the second control unit 67 transfers the data of the second reference spectrum to the first control unit 11. The first control unit 11 stores data of the second reference spectrum in the memory 47 as one piece of spectrum data 56.

Next, the first control unit 11 calculates the reflectance. The reflectance is obtained by Formula (1). $\lambda$ indicates the wavelength, which has a value of 5 nm in the interval from 400 nm to 700 nm. RR ($\lambda$) indicates the reflectance when the wavelength is $\lambda$. LVP1($\lambda$) indicates the light reception amount of the first standard plate when the wavelength is $\lambda$, and is obtained from the first reference spectrum. LVP2($\lambda$) indicates the light reception amount of the second standard plate when the wavelength is $\lambda$, and is obtained from the second reference spectrum. CORP1 is a constant indicating the calibration value of the first standard plate.

$$RR(\lambda) = \frac{LVP2(\lambda)}{LVP1(\lambda)} \times CORP1 \quad (1)$$

Figure 12:
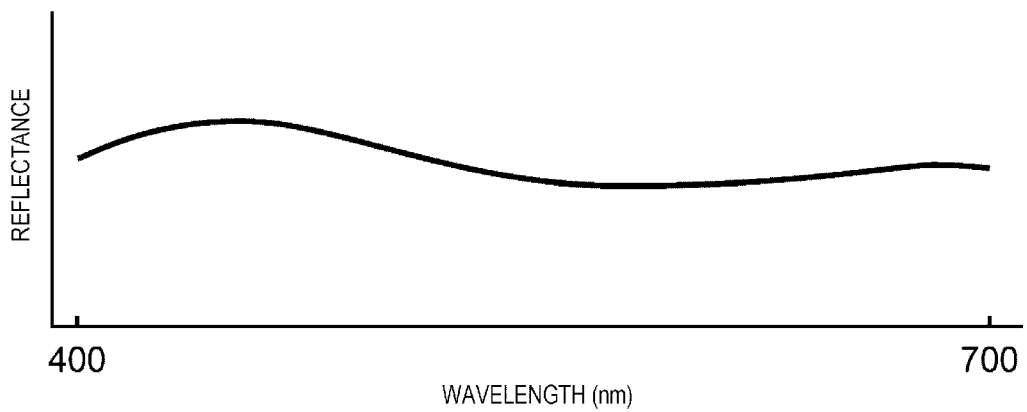
FIG. 12 is a graph for explaining the spectroscopic measurement method.

As shown in Formula (1), the reflectance of the wavelength $\lambda$ is calculated by dividing the light reception amount ($\lambda$) of the second standard plate by the light reception amount ($\lambda$) of the first standard plate, and multiplying the calibration value of the first standard plate. As shown in FIG. 12, a spectrum showing the distribution of the reflectance at each wavelength $\lambda$ is obtained. The spectrum shown in FIG. 12 shows one example. The reference reflectance spectrum is calculated in this manner. The reflection spectrum is a spectrum of the reflected light 28a, and the reflectance spectrum shows the spectrum of the ratio of the reflected light 28a reflected by two types of surfaces.

Figure 13:
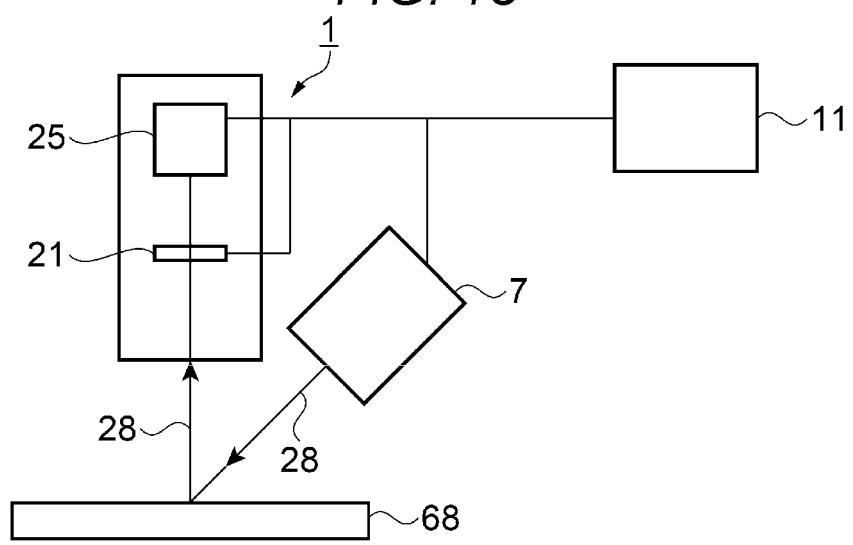
FIG. 13 is a diagram for explaining the spectroscopic measurement method.

As shown in FIG. 13, next, the first standard plate 68 is disposed at a position where the light emitting portion 7 of the spectroscopic measurement apparatus 1 emits the light 28. Then, the light emitting portion 7 irradiates the first standard plate 68 with the light 28, and the reflected light 28 is dispersed by the filter unit 21 and received by the light receiving unit 25. The spectroscopic measurement apparatus 1 measures the light reception amount of each wavelength in the range from 400 nm to 700 nm to store in the memory 47. The spectroscopic measurement apparatus 1 measures and stores the light reception amount at a wavelength interval of 5 nm from 400 nm to 700 nm. Then, the first control unit 11 calculates the reflection spectrum from the light reception amount of each wavelength. The spectrum obtained by the spectroscopic measurement apparatus 1 measuring the first standard plate 68 is referred to as a first measurement spectrum.

Figure 14:
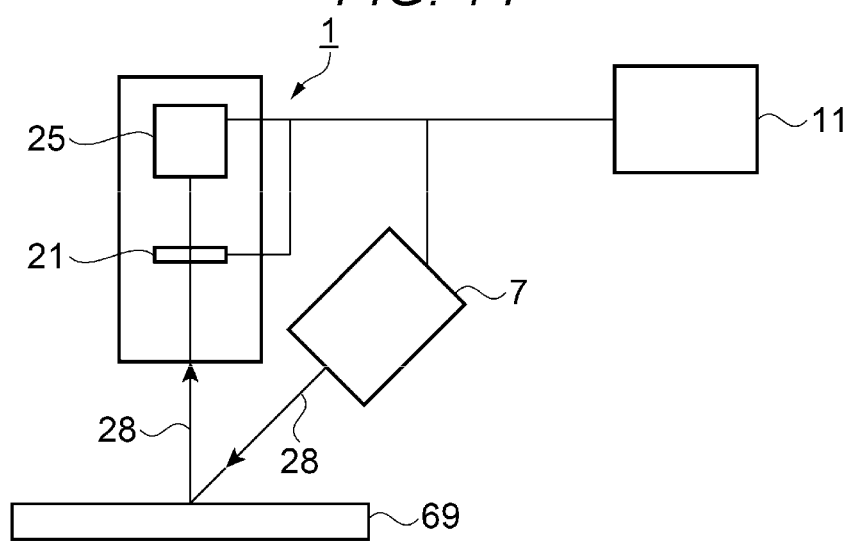
FIG. 14 is a diagram for explaining the spectroscopic measurement method.

As shown in FIG. 14, next, the second standard plate 69 is disposed at a position where the light emitting portion 7 of the spectroscopic measurement apparatus 1 emits the light 28. Then, the light emitting portion 7 irradiates the second standard plate 69 with the light 28, and the reflected light 28 is dispersed by the filter unit 21 and received by the light receiving unit 25. The spectroscopic measurement apparatus 1 measures the light reception amount of each wavelength in the range from 400 nm to 700 nm and stores it in the memory 47. The spectroscopic measurement apparatus 1 measures and stores the light reception amount at a wavelength interval of 5 nm from 400 nm to 700 nm. Then, the first control unit 11 calculates the reflection spectrum from the light reception amount of each wavelength. The spectrum obtained by the spectroscopic measurement apparatus 1 measuring the second standard plate 69 is referred to as a second measurement spectrum. The first measurement spectrum and the second measurement spectrum have different distributions.

Figure 15:
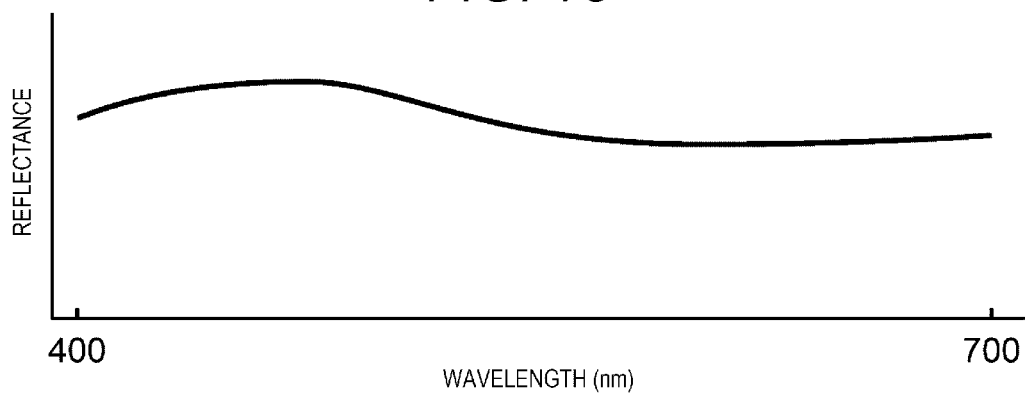
FIG. 15 is a graph for explaining the spectroscopic measurement method.

Next, the first control unit 11 calculates the reflectance. The reflectance is obtained by Formula (1). The light reception amount ($\lambda$) of the first standard plate can be obtained from the first measurement spectrum. The light reception amount ($\lambda$) of the second standard plate can be obtained from the second measurement spectrum. As shown in FIG. 15, a spectrum showing the distribution of the reflectance at each wavelength $\lambda$ is obtained. The spectrum shown in FIG. 15 shows one example. The measurement reflectance spectrum is calculated in this manner.

The relationship between the reference reflectance spectrum, the measurement reflectance spectrum, and the transformation matrix is described in detail in JP-A-2014-038042. An outline is described in the present embodiment. A sequence in which the reflectances at wavelength intervals of 5 nm from 400 nm to 700 nm in the measurement reflectance spectrum are arranged is referred to as a measurement reflectance spectrum D. The number of elements of the measurement reflectance spectrum D is 61. The measurement reflectance spectrum D is a form in which a sequence is displayed in a vector form. Similarly, a sequence in which the reflectances at wavelength intervals of 5 nm from 400 nm to 700 nm in the reference reflectance spectrum are arranged is referred to as a reference reflectance spectrum S. The reference reflectance spectrum S is a form in which a sequence is displayed in a vector form. The number of elements of the reference reflectance spectrum S is 61. A transformation matrix M is displayed in a form of a matrix.

Here, the relationship between the measurement reflectance spectrum D, the reference reflectance spectrum S, and the transformation matrix M is expressed by Formula (2). The reference reflectance spectrum S is a sequence from s1 to s61. The measurement reflectance spectrum D is a sequence from d1 to d61. The transformation matrix M is a 61×61 matrix of m1·1 to m61·61. The measurement reflectance spectrum D and the reference reflectance spectrum S are expressed in the form of a horizontal vector.

$$\begin{pmatrix} s1 \\ s2 \\ s3 \\ s4 \\ \vdots \\ s58 \\ s59 \\ s60 \\ s61 \end{pmatrix} = \begin{pmatrix} m1\cdot 1 & m1\cdot 2 & m1\cdot 3 & \ldots & m1\cdot 61 \\ m2\cdot 1 & m2\cdot 2 & m2\cdot 3 & \ldots & m2\cdot 61 \\ m3\cdot 1 & m3\cdot 2 & m3\cdot 3 & \ldots & m3\cdot 61 \\ m4\cdot 1 & m4\cdot 2 & m4\cdot 3 & \ldots & m4\cdot 61 \\ \vdots & \vdots & \vdots & & \vdots \\ m58\cdot 1 & m58\cdot 2 & m58\cdot 3 & \ldots & m58\cdot 61 \\ m59\cdot 1 & m59\cdot 2 & m59\cdot 3 & \ldots & m59\cdot 61 \\ m60\cdot 1 & m60\cdot 2 & m60\cdot 3 & \ldots & m60\cdot 61 \\ m61\cdot 1 & m61\cdot 2 & m61\cdot 3 & \ldots & m61\cdot 61 \end{pmatrix} \begin{pmatrix} d1 \\ d2 \\ d3 \\ d4 \\ \vdots \\ d58 \\ d59 \\ d60 \\ d61 \end{pmatrix} \quad (2)$$

The measurement reflectance spectrum D and the reference reflectance spectrum S are expressed in the form of a row vector. Then, Formula (2) is also displayed in the form of Formula (3).

$$S^t = M \cdot D^t \quad (3)$$

"t" of $S^t$, $D^t$ represents transposition.

Calculate M such that $M \cdot D^t$ is close to $S^t$. An evaluation function F shown in Formula (4) is set to explain this calculation method.

$$F(M) = |S^t - M \cdot D^t|^2 \quad (4)$$

When the evaluation function F(M) is minimized, M becomes M in Formula (3). The necessary and sufficient condition for the evaluation function F(M) to be minimized is that the value obtained by partially differentiating the evaluation function F (M) by M becomes 0 as shown in the Formula (5).

$$\frac{\partial F(M)}{\partial M} = -2(D^t \cdot S - D^t \cdot D \cdot M) = 0 \quad (5)$$

Partial differentiation of the evaluation function F(M) by M is performed by partially differentiating the evaluation function F(M) by each element (m1·1, m1·2, m1·3, . . . ) of the transformation matrix M.

Formula (6) is obtained by converting Formula (5) to calculate M.

$$Ms = (D^t \cdot D)^{-1} \cdot D^t \cdot S \quad (6)$$

When the number of elements of the measurement reflectance spectrum D and the reference reflectance spectrum S is 61, it is not possible to uniquely determine the transformation matrix M. Therefore, color filters are provided in the light source unit 15 and the light source 66 to measure the reflection spectra of a plurality of types of light. The light 28 emitted to the first standard plate 68 and the second standard plate 69 is referred to as sample light.

Then, the reference reflectance spectrum S is irradiated with a plurality of sample lights, and the reference reflectance spectrum S measured by the reference spectroscopic measurement apparatus 65 is shown in Formula (7). The reference reflectance spectrum S is expressed in the form of a matrix. The sample light is measured with light of multiple colors. The value of the reflectance measured for each sample light is set for each row of the reference reflectance spectrum S. C1, C2, C3, and C4 indicate a first color, a second color, a third color, and a fourth color, respectively. n indicates the number of colors, and k indicates a spectrum point number.

$$S^t_{nk} = \begin{pmatrix} C1 & C2 & C3 & C4 \\ \downarrow & \downarrow & \downarrow & \downarrow \\ s1\cdot 1 & s2\cdot 1 & s3\cdot 1 & s4\cdot 1 & \ldots \\ s1\cdot 2 & s2\cdot 2 & s3\cdot 2 & s4\cdot 2 & \ldots \\ s1\cdot 3 & s2\cdot 3 & s3\cdot 3 & s4\cdot 3 & \ldots \\ s1\cdot 4 & s2\cdot 4 & s3\cdot 4 & s4\cdot 4 & \ldots \\ \vdots & \vdots & \vdots & \vdots \\ s1\cdot 78 & s2\cdot 78 & s3\cdot 78 & s4\cdot 78 & \ldots \\ s1\cdot 79 & s2\cdot 79 & s3\cdot 79 & s4\cdot 79 & \ldots \\ s1\cdot 80 & s2\cdot 80 & s3\cdot 80 & s4\cdot 80 & \ldots \\ s1\cdot 81 & s2\cdot 81 & s3\cdot 81 & s4\cdot 81 & \ldots \end{pmatrix} \quad (7)$$

The measurement reflectance spectrum D is measured by the spectroscopic measurement apparatus 1 by irradiating a plurality of sample lights, and is shown in Formula (8). The measurement reflectance spectrum D is expressed in the form of a matrix. The sample light is measured with light of multiple colors. The value of the reflectance measured for each sample light is set for each row of the measurement reflectance spectrum D. C1, C2, C3, and C4 indicate a first color, a second color, a third color, and a fourth color, respectively. n indicates the number of colors, and m indicates a spectrum point number.

$$D^t_{nm} = \begin{pmatrix} C1 & C2 & C3 & C4 \\ \downarrow & \downarrow & \downarrow & \downarrow \\ d1\cdot 1 & d2\cdot 1 & d3\cdot 1 & d4\cdot 1 & \ldots \\ d1\cdot 2 & d2\cdot 2 & d3\cdot 2 & d4\cdot 2 & \ldots \\ d1\cdot 3 & d2\cdot 3 & d3\cdot 3 & d4\cdot 3 & \ldots \\ d1\cdot 4 & d2\cdot 4 & d3\cdot 4 & d4\cdot 4 & \ldots \\ \vdots & \vdots & \vdots & \vdots \\ d1\cdot 58 & d2\cdot 58 & d3\cdot 58 & d4\cdot 58 & \ldots \\ d1\cdot 59 & d2\cdot 59 & d3\cdot 59 & d4\cdot 59 & \ldots \\ d1\cdot 60 & d2\cdot 60 & d3\cdot 60 & d4\cdot 60 & \ldots \\ d1\cdot 61 & d2\cdot 61 & d3\cdot 61 & d4\cdot 61 & \ldots \end{pmatrix} \quad (8)$$

Subsequently, the spectrum calculation unit 63 calculates the transformation matrix M by substituting Formulae (7) and (8) in Formula (6). In this manner, the transformation matrix can be set using the reflectance spectrum measured by the reference spectroscopic measurement apparatus 65 by irradiating the first standard plate 68 and the second standard plate 69 with standard light from the light source 66 and the reflectance spectrum measured by the spectroscopic measurement apparatus 1 by irradiating the first standard plate 68 and the second standard plate 69 with the light 28 emitted from the light emitting portion 7.

Figure 16:
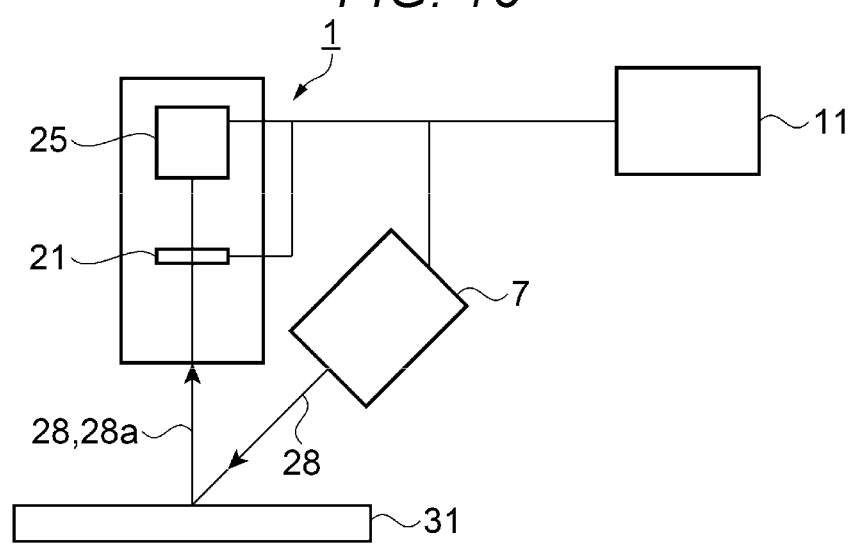
FIG. 16 is a diagram for explaining the spectroscopic measurement method.

FIGS. 16 to 21 are diagrams and graphs corresponding to the measurement process of step S2. As shown in FIG. 16, in step S2, the measurement target 31 is disposed at a position where the light emitting portion 7 of the spectroscopic measurement apparatus 1 emits the light 28. Then, the light emitting portion 7 irradiates the measurement target 31 with the light 28, and the reflected light 28 is dispersed by the filter unit 21 and received by the light receiving unit 25. The spectroscopic measurement apparatus 1 measures the light reception amount of each wavelength in the range from 400 nm to 700 nm and stores it in the memory 47. The spectroscopic measurement apparatus 1 measures and stores the light reception amount at a wavelength interval of 5 nm from 400 nm to 700 nm. Then, the first control unit 11 calculates the reflection spectrum from the light reception amount of each wavelength. The spectrum obtained by the spectroscopic measurement apparatus 1 measuring the measurement target 31 is referred to as an object measurement spectrum.

Figure 17:
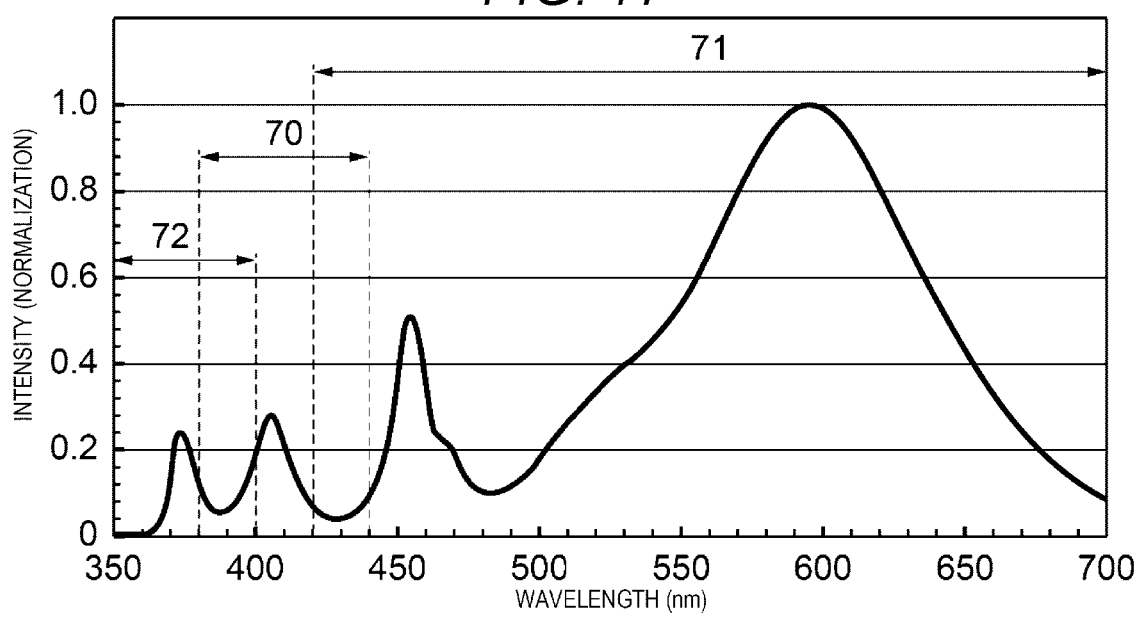
FIG. 17 is a graph for explaining the spectroscopic measurement method.

FIG. 17 shows the spectrum of the light 28 emitted from the light source unit 15. In FIG. 17, the vertical axis indicates the intensity of the light 28 emitted from the light source unit 15. In the graph in FIG. 17, the data is normalized so that the strongest light intensity is 1. The horizontal axis indicates the wavelength. A first wavelength band 70 is a wavelength band in which the first light emitting element 4 emits light. The wavelength of the first wavelength band 70 is from 380 nm to 440 nm. Therefore, the first light emitting element 4 emits the light 28 including the light having all wavelengths in the range from 400 nm to 430 nm. A second wavelength band 71 is wavelength band in which the second light emitting element 3 emits light. The wavelength of the second wavelength band 71 is from 420 nm to 700 nm. Therefore, the second light emitting element 3 emits the light including the light 28 having all wavelengths in the range from 430 nm to 700 nm. A fourth wavelength band 72 is a wavelength band in which the fourth light emitting element 5 emits light. The wavelength of the fourth wavelength band 72 is from 350 nm to 400 nm. Therefore, the fourth light emitting element 5 emits the light including the light 28 having all wavelengths in the range from 360 nm to 400 nm.

When the measurement target 31 does not include a fluorescent substance, the first light emitting element 4 and the second light emitting element 3 are turned on when the spectroscopic measurement apparatus 1 performs measurement. Then, the light emitting portion 7 simultaneously emits the light including light having all wavelengths in a wavelength range from 400 nm to 700 nm to the measurement target 31. The light 28 emitted from the light emitting portion 7 is emitted to the measurement target 31. The measurement target 31 reflects a portion of the light 28 irradiated. A portion of the light 28 reflected by the measurement target 31 advances toward the filter unit 21. The filter unit 21 disperses the light having a predetermined wavelength in the range from 400 nm to 700 nm from the reflected light 28a reflected by the measurement target 31.

When the measurement target 31 includes a fluorescent substance, the first light emitting element 4, the second light emitting element 3, and the fourth light emitting element 5 are turned on when the spectroscopic measurement apparatus 1 performs measurement. Then, the wavelength range of the light 28 emitted from the light emitting portion 7 is set from 360 nm to 700 nm. The wavelength range of the light 28 dispersed by the filter unit 21 is from 400 nm to 700 nm. When the measurement target 31 includes a fluorescent substance, the measurement target 31 receives the light 28 emitted from the measurement target 31 with a wavelength from 360 nm to 400 nm and emits the light 28 having a wavelength equal to or greater than 400 nm. For this reason, the light emitting portion 7 irradiates the measurement target 31 with the light 28 having a wavelength shorter than the range of wavelengths to be measured and performs measurement.

The light receiving unit 25 is irradiated with the light 28 dispersed by the filter unit 21. The light receiving unit 25 receives the dispersed light 28 and outputs the second light reception amount indicating the light intensity of the received light 28.

The filter control unit 61 changes the wavelength dispersed by the filter unit 21 at every 5 nm from 400 nm to 700 nm. Then, when switching the wavelength of the light 28 dispersed by the filter unit 21, the light reception control unit 62 stores the second light reception amount received by the light receiving unit 25 in the memory 47 as one piece of light reception amount data 55. Therefore, the memory 47 stores the second light reception amount of the wavelength at every 5 nm from 400 nm to 700 nm. Then, the spectrum calculation unit 63 calculates the object measurement spectrum using the second light reception amount of each wavelength.

Figure 18:
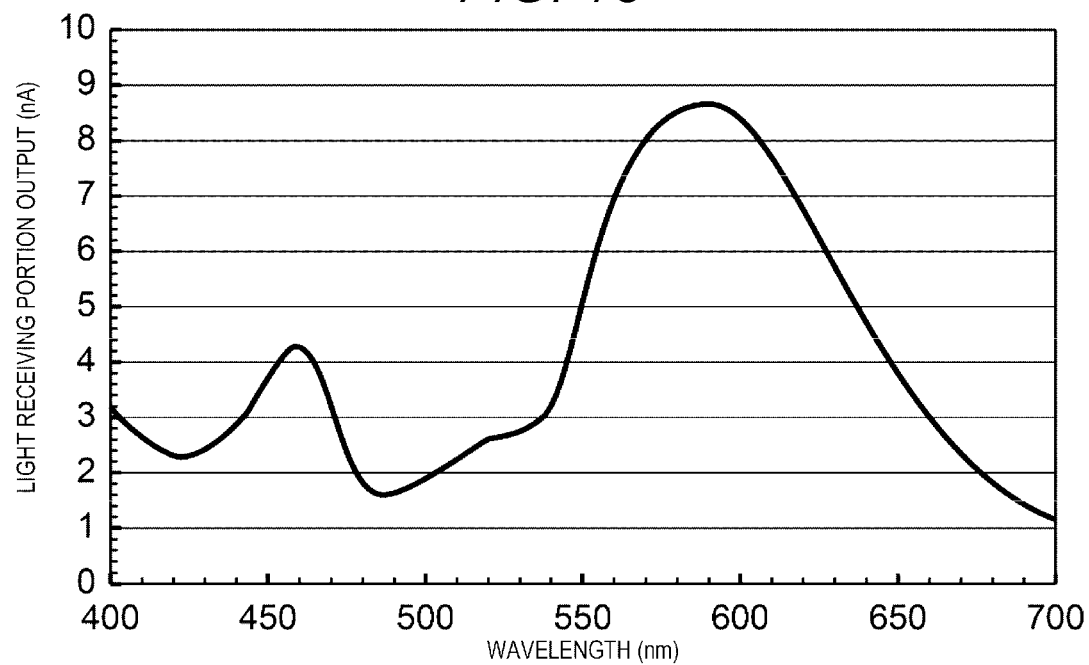
FIG. 18 is a graph for explaining the spectroscopic measurement method.

As a result, the object measurement spectrum is obtained as shown in FIG. 18. The vertical axis of FIG. 18 indicates the current value of a light receiving unit output output from the light receiving unit 25. The horizontal axis indicates the wavelength of the light 28 dispersed by the filter unit 21. The measurement spectrum shows the second light reception amount of a wavelength from 400 nm to 700 nm.

Figure 19:
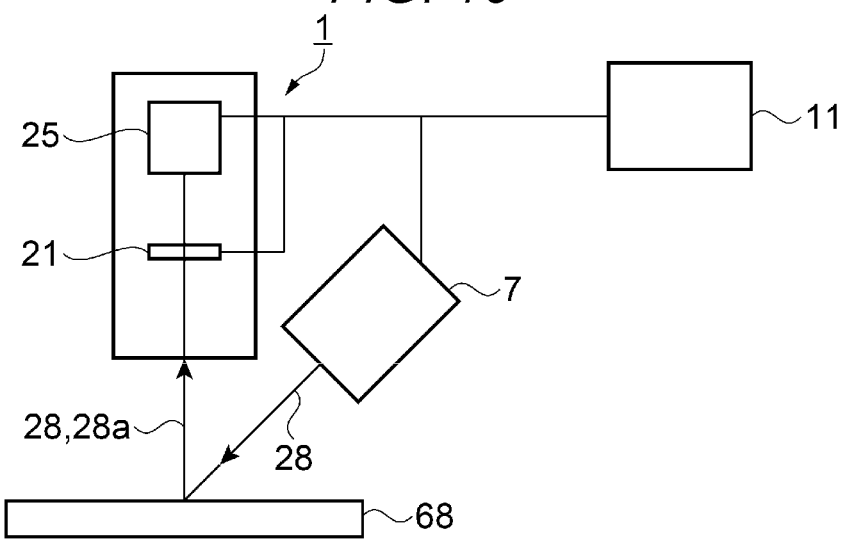
FIG. 19 is a diagram for explaining the spectroscopic measurement method.

As shown in FIG. 19, in step S2, the first standard plate 68 is disposed at a position where the light emitting portion 7 of the spectroscopic measurement apparatus 1 emits the light 28. Then, the light emitting portion 7 irradiates the first standard plate 68 with the light 28, and the reflected light 28 is dispersed by the filter unit 21 and received by the light receiving unit 25. The spectroscopic measurement apparatus 1 measures the first light reception amount of each wavelength in a range from 400 nm to 700 nm and stores it in the memory 47. The spectroscopic measurement apparatus 1 measures and stores the first light reception amount at a wavelength interval of 5 nm from 400 nm to 700 nm. Then, the spectrum calculation unit 63 of the first control unit 11 calculates the reflection spectrum from the first light reception amount of each wavelength. This reflection spectrum is a spectrum obtained by the spectroscopic measurement apparatus 1 measuring the first standard plate 68 and is the first measurement spectrum.

When the spectroscopic measurement apparatus 1 performs measurement, the first light emitting element 4, the second light emitting element 3, and the fourth light emitting element 5 are turned on. Then, the light emitting portion 7 simultaneously emits the light including light having all wavelengths in a wavelength range from 400 nm to 700 nm to the first standard plate 68. The light 28 emitted from the light emitting portion 7 is emitted to the first standard plate 68. The first standard plate 68 reflects a portion of the light 28 irradiated. A portion of the light 28 reflected by the first standard plate 68 advances toward the filter unit 21. The filter unit 21 disperses the light having a predetermined wavelength in a range from 400 nm to 700 nm from the reflected light 28a reflected by the first standard plate 68.

The light receiving unit 25 is irradiated with the light 28 dispersed by the filter unit 21. The light receiving unit 25 receives the dispersed light 28 and outputs the first light reception amount indicating the light intensity of the received light 28. The first light reception amount is the light intensity of the light 28 received by the light receiving unit 25 after the filter unit 21 dispersing the reflected light 28a reflected by the first standard plate 68.

The filter control unit 61 changes the wavelength dispersed by the filter unit 21 at every 5 nm from 400 nm to 700 nm. Then, when switching the wavelength of the light 28 dispersed by the filter unit 21, the light reception control unit 62 stores the first light reception amount received by the light receiving unit 25 in the memory 47 as one piece of light reception amount data 55. Therefore, the memory 47 stores the first light reception amount of the wavelength at every 5 nm from 400 nm to 700 nm. Then, the spectrum calculation unit 63 calculates the measurement spectrum using the first light reception amount at each wavelength.

Figure 20:
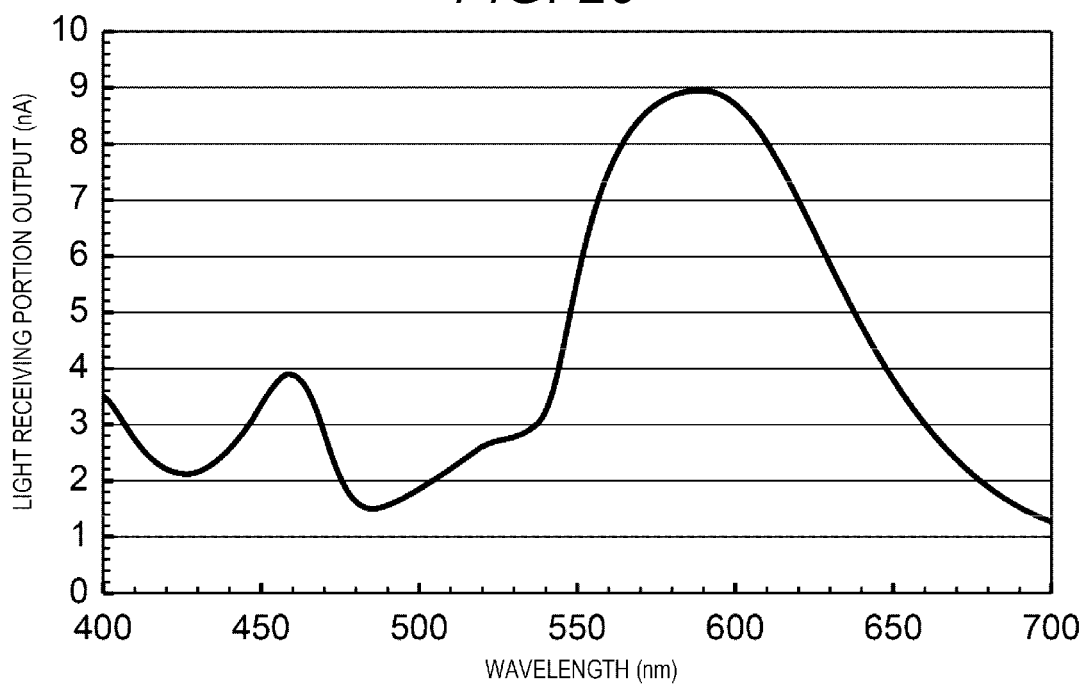
FIG. 20 is a graph for explaining the spectroscopic measurement method.

As a result, the measurement spectrum of the first light reception amount is obtained as shown in FIG. 20. The vertical axis of FIG. 20 indicates the current value of a light receiving unit output output from the light receiving unit 25. The current value of the light receiving portion output is data corresponding to the first light reception amount. The horizontal axis indicates the wavelength of the light 28 dispersed by the filter unit 21. The measurement spectrum shows the first light reception amount of a wavelength from 400 nm to 700 nm.

Next, the spectrum calculation unit 63 calculates the reflectance. The spectrum calculation unit 63 receives the first light reception amount and the second light reception amount of each wavelength from the light receiving unit 25 and calculates the reflectance spectrum when the measurement target 31 is irradiated with the light 28. Formula (9) is used for the calculation of the reflectance. RR ($\lambda$) indicates the reflectance when the wavelength is $\lambda$. LV1 ($\lambda$) indicates the first light reception amount when the wavelength is $\lambda$. LV2($\lambda$) indicates the second light reception amount when the wavelength is $\lambda$. CORP1 is a constant indicating the calibration value of the first standard plate. As shown in Formula (9), the spectrum calculation unit 63 calculates the reflectance by dividing the second light reception amount of a predetermined wavelength by the first light reception amount and multiplying the calibration value of the first standard plate. Then, the spectrum calculation unit 63 calculates the measurement reflectance spectrum from the reflectance at a plurality of wavelengths.

$$RR(\lambda) = \frac{LV2(\lambda)}{LV1(\lambda)} \times CORP1 \qquad (9)$$

Figure 21:
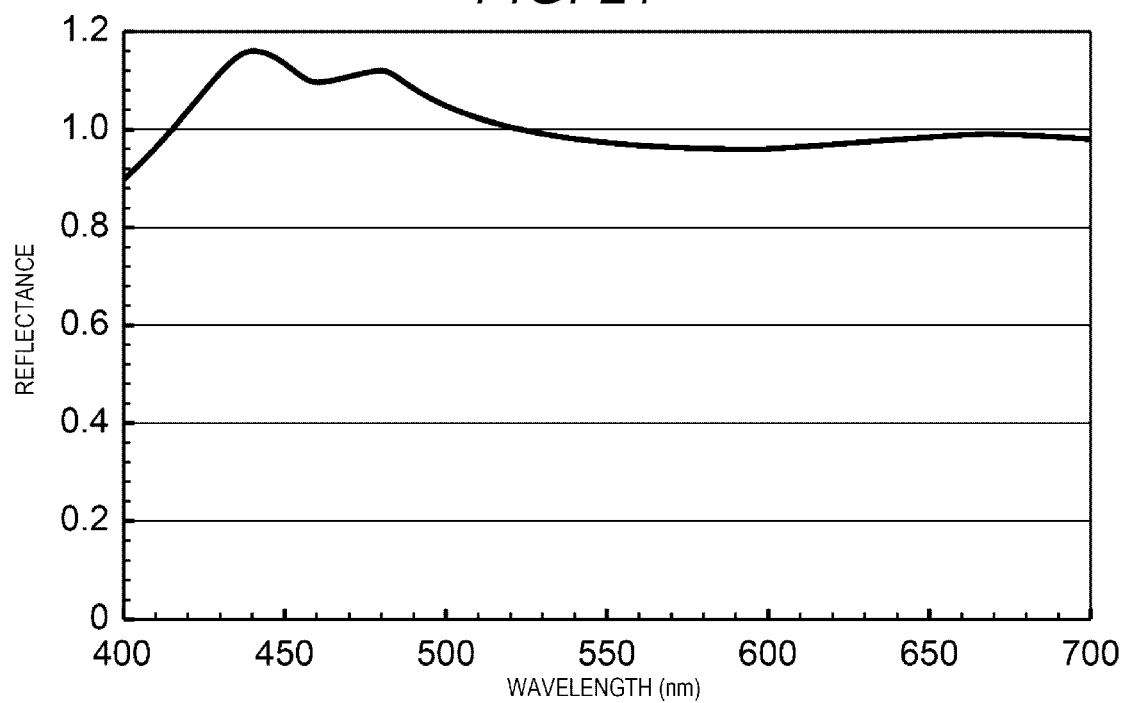
FIG. 21 is a graph for explaining the spectroscopic measurement method.

As a result, the measurement reflectance spectrum is obtained as shown in FIG. 21. The reflectance is shown on the vertical axis in FIG. 21, and the wavelength is shown on the horizontal axis. If there is a range in which the light reception amount is not detected in the measured wavelength range, the reflectance at a predetermined wavelength cannot be calculated with high accuracy. In the present method, the light including light having all wavelengths in a wavelength range from 400 nm to 700 nm is simultaneously emitted to the first standard plate 68. Then, the light including the light 28 of all wavelengths in a wavelength range from 400 nm to 700 nm is simultaneously emitted to the measurement target 31. Therefore, since there is no region in which the light reception amount is not detected in the measured wavelength range, the reflectance of a predetermined wavelength can be calculated with high accuracy.

Figure 22:
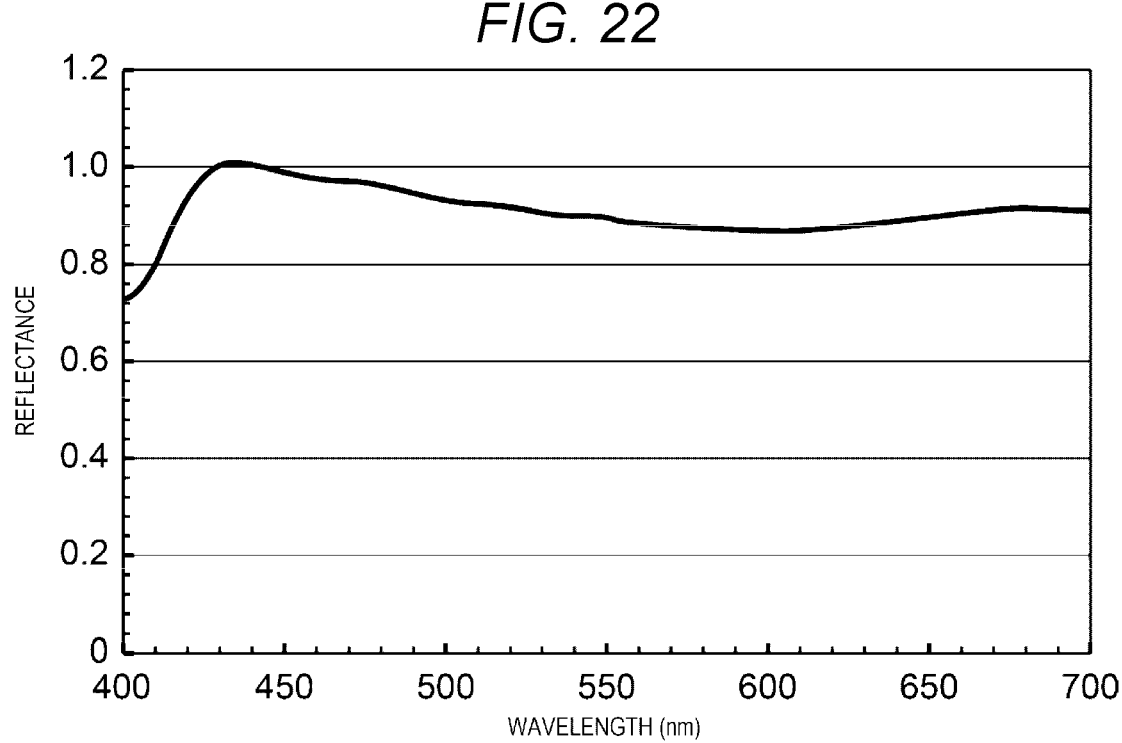
FIG. 22 is a graph for explaining the spectroscopic measurement method.

FIG. 22 is a graph corresponding to the spectrum conversion process of step S3. In step S3, an estimation reflectance spectrum E is calculated from the measurement reflectance spectrum D and the transformation matrix M. A relational expression of the measurement reflectance spectrum D, the transformation matrix M, and the estimation reflectance spectrum E is shown in Formula (10).

$$E^t = M \cdot D^t \qquad (10)$$

That is, the estimation reflectance spectrum E is calculated by multiplying the transformation matrix M by the transposed measurement reflectance spectrum D. As a result, the estimation reflectance spectrum E is obtained as shown in FIG. 22. The reflectance is shown on the vertical axis in FIG. 22, and the wavelength is shown on the horizontal axis. The estimation reflectance spectrum E is an estimated spectrum obtained by measuring the spectrum of the reflectance of the measurement target 31 using the reference spectroscopic measurement apparatus 65. As described above, the spectrum calculation unit 63 performs calculation of estimating the reference reflectance spectrum as measured by the reference spectroscopic measurement apparatus 65 using the transformation matrix. The spectroscopic measurement process ends by the above-described processes.

As described above, according to the present embodiment, the following effects are obtained.

(1) According to the present embodiment, the light emitting portion 7 emits the light 28 to the measurement target 31. Here, the light emitting portion 7 simultaneously emits the light 28 composed of a plurality of LEDs and including the light 28 of all wavelengths in a wavelength range from 400 nm to 700 nm is emitted toward the measurement target 31. Then, the light 28 is reflected by the measurement target 31. The filter unit 21 disperses the light 28 having a predetermined wavelength from the reflected light 28a. The light receiving unit 25 receives the light dispersed by the filter unit 21. The light receiving unit 25 outputs the second light reception amount indicating the light intensity of the received light 28. The spectrum calculation unit 63 receives the output second light reception amount and calculates a measurement target reflection spectrum which is a reflection spectrum of the measurement target 31.

The spectrum calculation unit 63 calculates the reflectance of a predetermined wavelength using the second light reception amount of a plurality of wavelengths. Therefore, if there is a range in which the second light reception amount is not detected in the measured wavelength range, the reflectance at a predetermined wavelength cannot be calculated with high accuracy. Then, the light emitting portion 7 of the spectroscopic measurement apparatus 1 simultaneously emits the light 28 including the light having all wavelengths in a wavelength range from 400 nm to 700 nm to the measurement target 31. Therefore, since there is no region in which the light reception amount is not detected in the measured wavelength range, the reflectance of each wavelength in the measured wavelength range can be calculated with high accuracy.

(2) According to the present embodiment, the filter unit 21 disperses the reflected light 28a of the light 28 emitted from the light emitting portion 7 to the first standard plate 68, and the light receiving unit 25 receives the light. The sensor unit 27 outputs the first light reception amount to the spectrum calculation unit 63. Then, the spectrum calculation unit 63 receives the output first light reception amount. The spectrum calculation unit 63 calculates the reflectance by dividing the second light reception amount of each wavelength by the first light reception amount. Since the reflectance is calculated at each wavelength, the reflectance spectrum is calculated. The spectrum calculation unit 63 calculates the measurement reflectance spectrum from the reflectance at a plurality of wavelengths. Then, the spectrum calculation unit 63 calculates the estimated spectrum of the measurement target 31 using the transformation matrix. This transformation matrix is matrix data for estimating the data of the reflectance spectrum measured by the reference spectroscopic measurement apparatus 65 using the data of the reflectance spectrum measured by the spectroscopic measurement apparatus 1. Therefore, the reflectance spectrum measured by the reference spectroscopic measurement apparatus 65 can be estimated.

(3) According to the present embodiment, the first light emitting element 4 emits the light 28 including the light having all wavelengths in the range from 400 nm to 430 nm. Then, the second light emitting element 3 emits the light 28 including the light 28 of all wavelengths in the range from 430 nm to 700 nm. Therefore, when the first light emitting element 4 and the second light emitting element 3 are simultaneously turned on, the light 28 including the light 28 of all wavelengths in a wavelength range from 400 nm to 700 nm can be simultaneously emitted to the measurement target 31.

(4) According to the present embodiment, the light emitting portion 7 includes a purple light emitting diode (LED) and a white LED. When the purple LED and the white LED are simultaneously turned on, the light 28 including the light 28 of all wavelengths in a wavelength range from 400 nm to 700 nm can be simultaneously emitted to the measurement target 31.

(5) According to the present embodiment, the fourth light emitting element 5 emits the light 28 including the light 28 of all wavelengths in the range from 360 nm to 400 nm. Therefore, when LEDs including the fourth light emitting element 5 are simultaneously turned on, the light 28 including the light 28 of all wavelengths in a wavelength range from 360 nm to 700 nm can be simultaneously emitted to the measurement target 31. Then, the light 28 including the light 28 of all wavelengths in the wavelength range from 360 nm to 700 nm can be emitted to the measurement target 31.

(6) According to the present embodiment, the light emitting portion 7 includes a UV LED. When LEDs including UV LEDs are simultaneously turned on, the light 28 including the light 28 of all wavelengths in a wavelength range from 360 nm to 400 nm can be simultaneously emitted to the measurement target 31. Then, the light 28 including the light 28 of all wavelengths in the wavelength range from 360 nm to 700 nm can be emitted to the measurement target 31.

(7) According to the present embodiment, the LED provided in the light emitting portion 7 is a chip type LED. Since the chip type LED is thin, it can be surface mounted on a circuit substrate. Therefore, the LED can be mounted with high productivity.

(8) According to the present embodiment, the light 28 including the light 28 of all wavelengths in a wavelength range from 400 nm to 700 nm is simultaneously emitted to the first standard plate 68. Then, the light 28 of a predetermined wavelength in a range from 400 nm to 700 nm from the reflected light 28a reflected by the first standard plate 68 is dispersed. Then, the dispersed light 28 is received and output as the first light reception amount indicating the light intensity of the received light 28. The light 28 including the light 28 of all wavelengths in a wavelength range from 400 nm to 700 nm is simultaneously emitted to the measurement target 31. Then, the light 28 of a predetermined wavelength is dispersed from the reflected light 28a reflected by the measurement target 31. Then, the dispersed light 28 is received and output as the second light reception amount indicating the light intensity of the received light 28. Then, the reflectance is calculated by dividing the second light reception amount of a predetermined wavelength by the first light reception amount.

The transformation matrix is set using the reflectance spectrum measured by applying the standard light before the measurement of the measurement target 31 and the reflectance spectrum measured by applying the light 28 emitted from the light emitting portion 7. Then, when measuring the measurement target 31, the reflectance of each wavelength is calculated from the light reception amount of a plurality of wavelengths. Next, the reflectance spectrum is calculated using the reflectance at each wavelength and the transformation matrix.

If there is a range in which the light reception amount is not detected in the measured wavelength range, the reflectance at a predetermined wavelength cannot be calculated with high accuracy. In the present embodiment, the light 28 including the light 28 of all wavelengths in a wavelength range from 400 nm to 700 nm is simultaneously emitted to the first standard plate 68. Then, the light 28 including the light 28 of all wavelengths in a wavelength range from 400 nm to 700 nm is simultaneously emitted to the measurement target 31. Therefore, since there is no region in which the light reception amount is not detected in the measured wavelength range, the reflectance of a predetermined wavelength can be calculated with high accuracy. Furthermore, when multiplying the transformation matrix, since there is no portion of the wavelength band where no measurement data exits, it is possible to suppress the influence of the portion of the wavelength band where no measurement data exits to other wavelength bands. As a result, the spectroscopic measurement method can accurately measure the reflectance spectrum.

Second Embodiment

Figure 23:
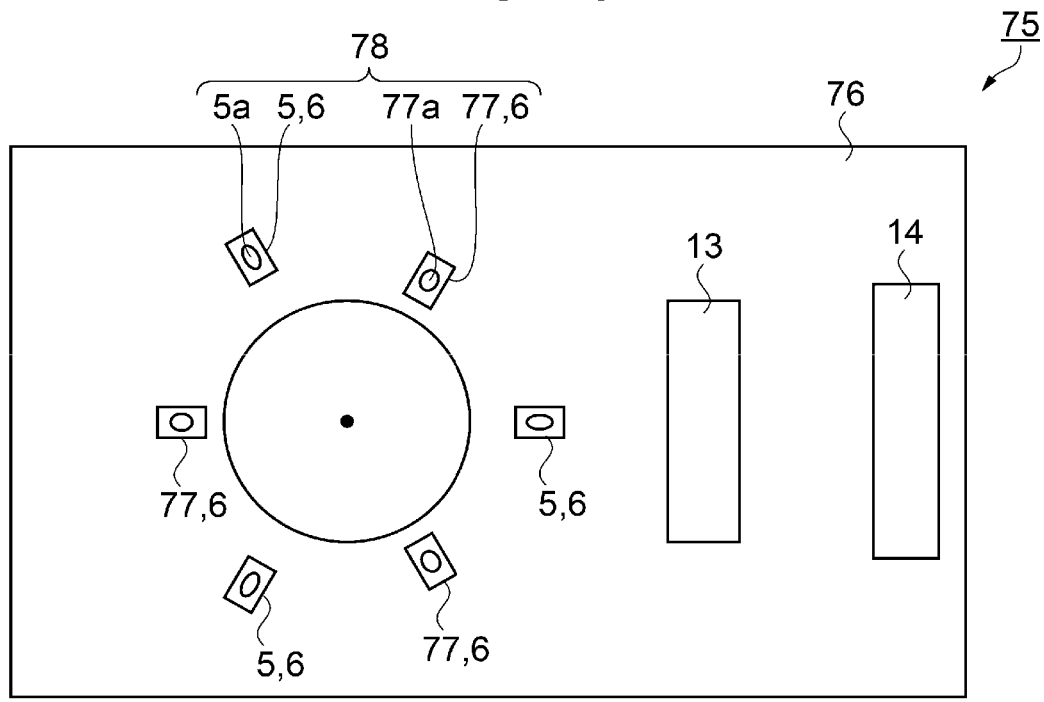
FIG. 23 is a schematic plan diagram showing a configuration of a light source unit according to a second embodiment.
Figure 24:
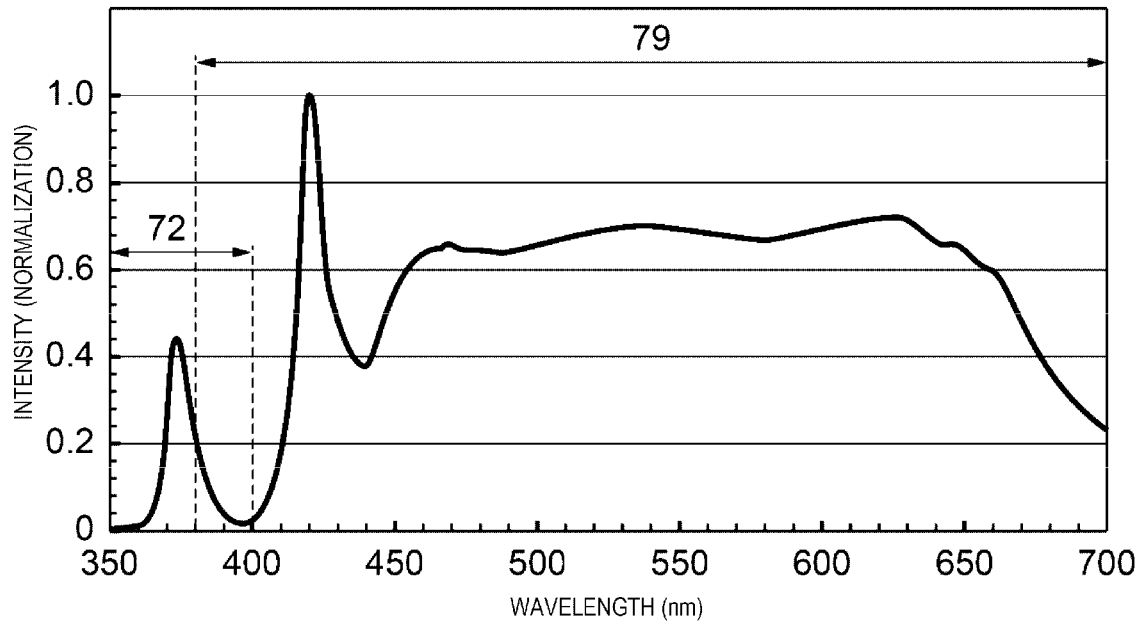
FIG. 24 is a graph showing a spectrum of light emitted from the light source unit.

Next, one embodiment of a spectroscopic measurement apparatus will be described using FIGS. 23 and 24. FIG. 23 is a schematic plan diagram showing a configuration of a light source unit. FIG. 24 is a graph showing the spectrum of light emitted by a light source unit. The present embodiment is different from the first embodiment in that the LEDs constituting the light emitting portion 7 are different. Description of the same points as the first embodiment will be omitted.

That is, in the present embodiment, as shown in FIG. 23, a spectroscopic measurement apparatus 75 includes a first substrate 76. The first substrate 76 is provided with two types of light emitting elements 6 of a third light emitting element 77 as a third light source and the fourth light emitting element 5. That is, the first substrate 76 is provided with a plurality of light emitting elements 6. The portions from which the third light emitting element 77 emits the light 28 are referred to as the third light emitting portions 77a. The third light emitting portion 77a and the fourth light emitting portion 5a correspond to the light emitting portion 78.

In this manner, the light emitting portion 78 includes the third light emitting element 77. Then, the light 28 including the light 28 of all wavelengths in a wavelength range from 400 nm to 700 nm is emitted from the third light emitting element 77. The third light emitting element 77 is a purple white LED.

The third light emitting element 77 as a third light source emits the light including the light having all wavelengths in a wavelength range from 400 nm to 700 nm. Therefore, when the third light emitting element 77 is turned on, the light including light having all wavelengths in a wavelength range from 400 nm to 700 nm can be simultaneously emitted to the measurement target 31.

In FIG. 24, the vertical axis indicates the intensity of the light 28 emitted from the light source unit 15. The data is normalized so that the strongest intensity is 1. The horizontal axis indicates the wavelength. A third wavelength band 79 is a wavelength band in which the third light emitting element 77 emits light. The wavelength of the third wavelength band 79 is from 380 nm to 700 nm. Therefore, the third light emitting element 77 emits the light 28 including the light 28 of all wavelengths in a wavelength range from 400 nm to 700 nm. The wavelength of the fourth wavelength band 72, which is a wavelength band emitted by the fourth light emitting element 5, is from 350 nm to 400 nm. Although the intensity of the light 28 is low near a wavelength of 400 nm, the light intensity of the light 28 is in a range in which the sensor unit 27 is capable of measuring the light reception amount of the reflected light 28a.

When the spectroscopic measurement apparatus 75 performs measurement, the third light emitting element 77 and the fourth light emitting element 5 are turned on. Then, the light emitting portion 78 simultaneously emits the light including light having all wavelengths in a wavelength range from 400 nm to 700 nm to the measurement target 31. The light 28 emitted from the light emitting portion 78 is emitted to the measurement target 31. The measurement target 31 reflects a portion of the light 28 irradiated. A portion of the light 28 reflected by the measurement target 31 advances toward the filter unit 21. The filter unit 21 disperses the light having a predetermined wavelength in the range from 400 nm to 700 nm from the reflected light 28a reflected by the measurement target 31.

The light emitting portion 78 of the present embodiment simultaneously emits the light including light having all wavelengths in a wavelength range from 400 nm to 700 nm to the measurement target 31. Therefore, since there is no region in which the light reception amount is not detected in the measured wavelength range, the reflectance of each wavelength in the measured wavelength range can be calculated with high accuracy.

Third Embodiment

Figure 25:
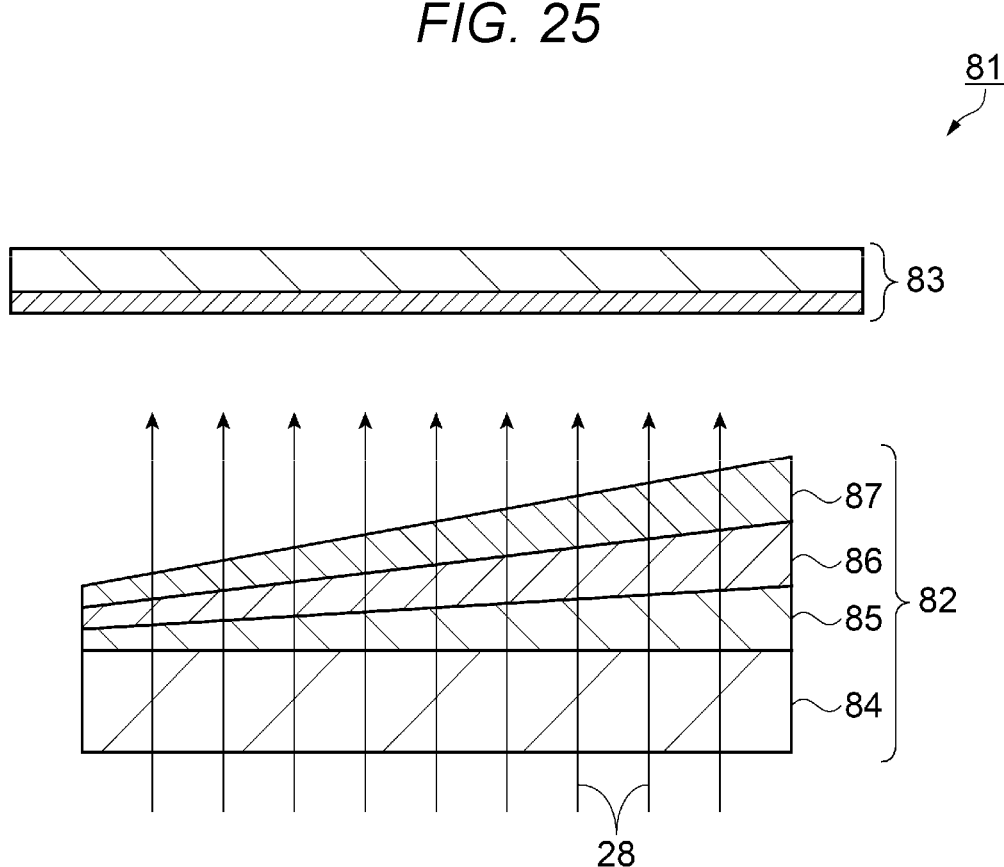
FIG. 25 is a schematic side sectional diagram showing a configuration of a light dispersing portion and a light receiving portion according to a third embodiment.

Next, one embodiment of a spectroscopic measurement apparatus will be described using FIG. 25. FIG. 25 is a schematic side sectional diagram showing a configuration of a light dispersing portion and a light receiving portion. The present embodiment is different from the first embodiment in that the configuration of the light dispersing portion and the light receiving portion are different. Description of the same points as the first embodiment will be omitted.

As shown in FIG. 25, a spectroscopic measurement apparatus 81 is provided with a linear variable filter (LVF) 82 as a light dispersing portion instead of the filter unit 21 in the first embodiment. Furthermore, the spectroscopic measurement apparatus 81 includes a line sensor 83 instead of the light receiving element 22 in the first embodiment.

The LVF 82 includes a substrate 84. The substrate 84 is a light transmitting glass substrate. A first partially-transmitting film 85, a transmitting film 86, and a second partially-transmitting film 87 are stacked on the substrate 84. The thickness of the transmitting film 86 in the direction in which the light 28 advances differs depending on the position. The left side in FIG. 25 is thinner than the right side. Then, the thickness of the transmitting film 86 is increased in proportion to the distance from the left end of FIG. 25. For this reason, in the LVF 82, the light 28 having a short wavelength passes through on the left side in FIG. 25, and the light 28 having a long wavelength passes through on the right side in FIG. 25. Therefore, the wavelength of the light 28 passing through the LVF 82 becomes longer as it goes from left to right in FIG. 25.

The line sensor 83 is a device in which a large number of phototransistors are arranged in the left and right in FIG. 25. In the line sensor 83, the phototransistor on the left side of FIG. 25 measures the light reception amount of the light 28 having a short wavelength. Then, in the line sensor 83, the phototransistor on the right side in FIG. 25 measures the light reception amount of the light 28 having a long wavelength. The line sensor 83 is capable of measuring light 28 having a wavelength from 400 nm to 700 nm.

The light emitting portion 78 of the spectroscopic measurement apparatus 81 simultaneously emits the light including the light having all wavelengths in a wavelength range from 400 nm to 700 nm to the measurement target 31. Then, the line sensor 83 can detect the light including the light 28 of all wavelengths in a wavelength range from 400 nm to 700 nm. The LVF 82 does not require the filter control unit 61 that controls the passing wavelength so that the first control unit 11 can be simplified.

Fourth Embodiment

Next, one embodiment of a food analysis apparatus including the above-described spectroscopic measurement apparatus 1 will be described using FIG. 26. The food analysis apparatus can be used for a substance component analysis apparatus such as a noninvasive measurement apparatus for saccharides by spectroscopy and a noninvasive measurement apparatus for information of food, living body, minerals, and the like. The food analysis apparatus is one of the substance component analysis apparatus. Description of the same points as the above embodiment will be omitted.

Figure 26:
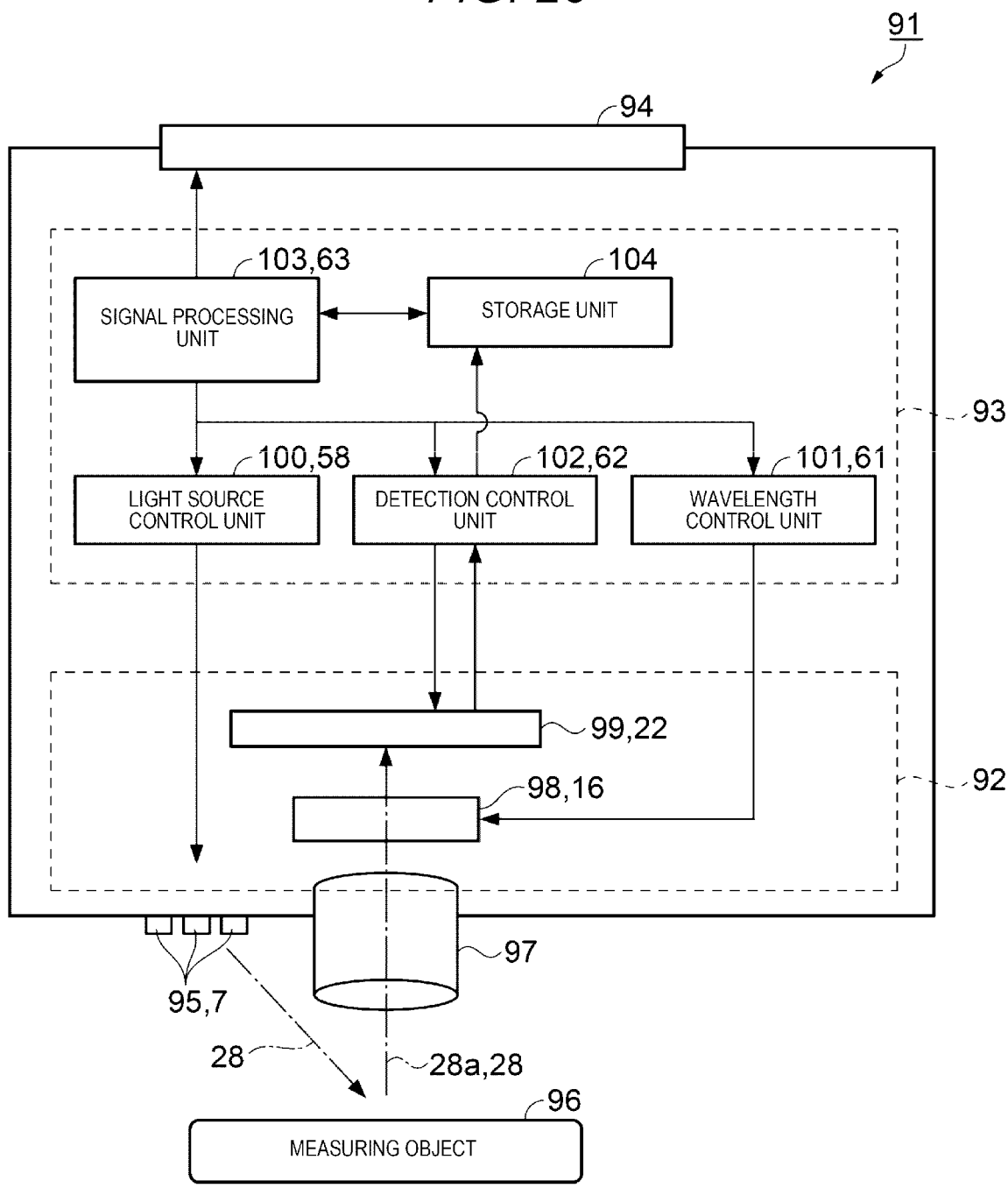
FIG. 26 is a block diagram showing a configuration of a food analysis apparatus according to a fourth embodiment.
Figure 27:
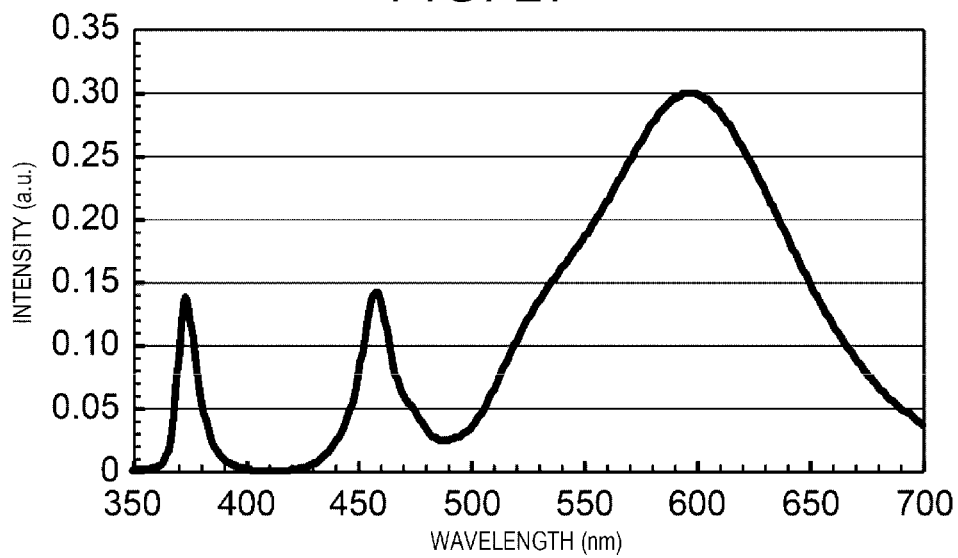
FIG. 27 is a graph showing an example of a spectrum of a light source in an example of related art.
Figure 28:
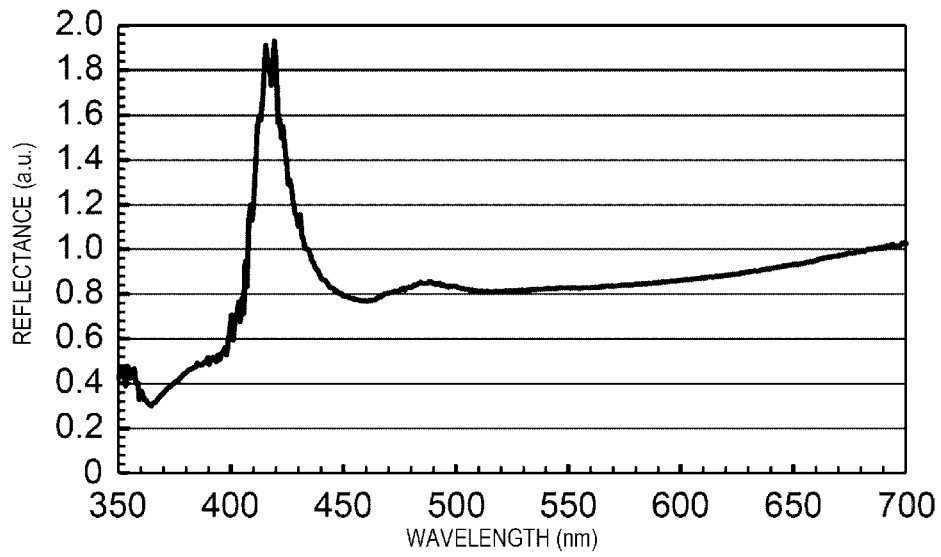
FIG. 28 is a graph showing an example of a spectrum of reflectance.

FIG. 26 is a block diagram showing a configuration of the food analysis apparatus. As shown in FIG. 26, a food analysis apparatus 91 as an electronic apparatus includes a detecting device 92, a control unit 93, and a display portion 94. The detecting device 92 includes a light source 95 for emitting the light 28, a light receiving lens 97 into which the reflected light 28a from a measuring object 96 is introduced, and an optical module 98 which disperses the reflected light 28a introduced from the light receiving lens 97. Furthermore, the detecting device 92 is provided with a light sensor 99 for detecting the dispersed light. Then, the spectroscopic measurement apparatus 1, the spectroscopic measurement apparatus 75, or the spectroscopic measurement apparatus 81 is used in the detecting device 92. The light source 95 includes an LED that emits near-infrared light in addition to the light emitting portion 7 of the first embodiment. The optical module 98 corresponds to the wavelength variable filter 16 of the first embodiment. The light sensor 99 corresponds to the light receiving element 22 of the first embodiment. The light sensor 99 is a two-dimensional area sensor.

A control unit 93 includes a light source control unit 100 which performs control of turning on and off the light source 95 and brightness control when the light source is turned on and a wavelength control unit 101 as a control unit which controls the optical module 98. The wavelength control unit 101 controls the optical module 98. Furthermore, the control unit 93 includes a detection control unit 102 which controls the light sensor 99 to acquire a spectral image received by the light sensor 99, a signal processing unit 103, and a storage unit 104.

The light source control unit 100 corresponds to the light source control unit 58 of the spectroscopic measurement apparatus 1, and the wavelength control unit 101 corresponds to the filter control unit 61 of the spectroscopic measurement apparatus 1. The detection control unit 102 corresponds to the light reception control unit 62 of the spectroscopic measurement apparatus 1, and the signal processing unit 103 includes the functions of the spectrum calculation unit 63 of the spectroscopic measurement apparatus 1.

When the food analysis apparatus 91 is driven, the light source control unit 100 controls the light source 95 so that the light source 95 irradiates the measuring object 96 with the light 28. Then, the light 28 reflected by the measuring object 96 passes through the light receiving lens 97 and enters the optical module 98. The optical module 98 is driven by the control of the wavelength control unit 101. Accordingly, the detecting device 92 can extract the light 28 of the target wavelength from the optical module 98. Then, the extracted light 28 is received by the light sensor 99. In addition, the received light 28 is accumulated in the storage unit 104 as a spectral image. Moreover, the signal processing unit 103 controls the wavelength control unit 101 to change the voltage value applied to the optical module 98, and acquires spectral images for each wavelength.

Then, the signal processing unit 103 performs a calculation process on each data of each pixel in each image accumulated in the storage unit 104 and obtains a spectrum at each pixel. In addition, the storage unit 104 stores information related to the component of the food with respect to the spectrum. The signal processing unit 103 analyzes the data of the spectrum based on the information related to the food stored in the storage unit 104. Then, the signal processing unit 103 obtains the food component contained in the measuring object 96 and the content of each food component. The signal processing unit 103 can also calculate food calories, freshness, and the like from the obtained food components and contents. Furthermore, by analyzing the spectrum distribution in the image, the signal processing unit 103 can perform, for example, extraction of a portion of the food to be examined where the freshness is reduced. Furthermore, the signal processing unit 103 can also detect foreign substances and the like contained in the food. Then, the signal processing unit 103 causes the display portion 94 to display information such as the component and content of the food to be examined, calories, and freshness obtained as described above.

The above-described spectroscopic measurement apparatus 1, the spectroscopic measurement apparatus 75, or the spectroscopic measurement apparatus 81 is used in the detecting device 92 of the food analysis apparatus 91. The above-described spectroscopic measurement apparatus 1, spectroscopic measurement apparatus 75, and spectroscopic measurement apparatus 81 can measure the reflectance spectrum with high accuracy. Therefore, the food analysis apparatus 91 can be the food analysis apparatus 91 including a spectroscopic measurement apparatus capable of measuring the reflectance spectrum with high accuracy.

In addition to the food analysis apparatus 91, it can be used as a non-invasive measurement apparatus for other information as described above, with substantially the same configuration. For example, it can be used as a biological analysis apparatus for analyzing biological components such as a measurement and analysis of body fluid components such as blood. Such a biological analysis apparatus, for example, the food analysis apparatus 91 can be used as an apparatus for measuring a body fluid component such as blood. In addition, if it is set as an apparatus which detects ethyl alcohol, the food analysis apparatus 91 can be used for a drunken driving prevention apparatus which detects a driver's drunk condition. Moreover, it can be used also as an electron endoscope system provided with such a biological analysis apparatus. Furthermore, it can also be used as a mineral analysis apparatus which performs mineral component analysis.

Furthermore, as an electronic apparatus using the above-described spectroscopic measurement apparatus 1, the spectroscopic measurement apparatus 75, and the spectroscopic measurement apparatus 81, the following apparatus can be applied. For example, it can be used for an ink jet printer. The above-described spectroscopic measurement apparatus 1, spectroscopic measurement apparatus 75, or spectroscopic measurement apparatus 81 is installed on a carriage for moving the ink jet head. Then, the spectroscopic measurement apparatus 1, the spectroscopic measurement apparatus 75, or the spectroscopic measurement apparatus 81 measures the reflectance spectrum of the image drawn by the ink droplet discharged by the ink jet head. The spectroscopic measurement apparatus 1, the spectroscopic measurement apparatus 75, or the spectroscopic measurement apparatus 81 can measure the reflectance spectrum with high accuracy. Therefore, the ink jet printer can be an electronic apparatus including spectroscopic measurement apparatus capable of measuring the reflectance spectrum with high accuracy.

The present embodiment is not limited to the above-described embodiment, and various changes and modifications can be made by those skilled in the art in the technical concept of the present disclosure. Modification examples will be described below.

Modification Example 1

In the first embodiment, the wavelength variable filter 16 disperses the light 28. In the third embodiment, the LVF 82 disperses the light 28. Alternatively, a diffraction grating may be used as a method of dispersing the light 28. The light 28 can be dispersed by using a diffraction grating.

Modification Example 2

In the first embodiment, the reflected light 28a of the second standard plate 69 is measured after the reflected light 28a of the first standard plate 68 was measured in the transformation matrix setting process in step S1. The measurement order of the standard plates may be reversed. The reflected light 28a of the first standard plate 68 may be measured after measuring the reflected light 28a of the second standard plate 69. The reflected light 28a of the first standard plate 68 and the second standard plate 69 was measured using the spectroscopic measurement apparatus 1 after measuring the reflected light 28a of the first standard plate 68 and the second standard plate 69 using the reference spectroscopic measurement apparatus 65. The order of the measurement apparatuses to be measured may be reversed. The reflected light 28a of the first standard plate 68 and the second standard plate 69 may be measured using the reference spectroscopic measurement apparatus 65 after measuring the reflected light 28a of the first standard plate 68 and the second standard plate 69 using the spectroscopic measurement apparatus 1.

In the measurement process of step S2, the reflected light 28a of the first standard plate 68 is measured after the reflected light 28a of the measurement target 31 is measured. The measurement order may be reversed. The reflected light 28a of the measurement target 31 may be measured after measuring the reflected light 28a of the first standard plate 68.

Modification Example 3

In the first embodiment, chip type LEDs are used as the second light emitting element 3, the first light emitting element 4, and the fourth light emitting element 5 of the light emitting portion 7. A shell type LED or a multi-segment type LED may be used as the second light emitting element 3, the first light emitting element 4, and the fourth light emitting element 5.

Modification Example 4

In the first embodiment, a purple LED, a white LED, and an UV LED are used in the configuration of the light emitting element 6. In the second embodiment, a purple white LED and an UV LED are used. The combination of LED colors is not limited to these two types. It may be a combination including a red LED, a green LED, a yellow LED, and the like. The combination of LEDs may be adjusted to have an emission spectrum close to that of an incandescent lamp.

The contents derived from the embodiment will be described below.

The spectroscopic measurement apparatus includes a light emitting portion simultaneously emitting light including light having all wavelengths in a wavelength range from 400 nm to 700 nm to a measurement target, a light dispersing portion dispersing the reflected light reflected by the measurement target to a predetermined wavelength, a light receiving portion that receives the light dispersed by the light dispersing portion and outputs a second light reception amount indicating the light intensity of the received light to the measurement target, and a calculation unit that receives the second light reception amount of each wavelength and calculates a reflection spectrum when the measurement target is irradiated with light, in which the calculation unit calculates reflectance of a predetermined wavelength using the second light reception amounts of a plurality of wavelengths.

According to this configuration, the light emitting portion emits light to the measurement target. Here, the light emitting portion simultaneously emits the light including light having all wavelengths in a wavelength range from 400 nm to 700 nm. Then, the light is reflected by the measurement target. This reflected light is referred to as reflected light. The light dispersing portion disperses the light having a predetermined wavelength from the reflected light. The light receiving portion receives the light dispersed by the light dispersing portion. The light receiving portion outputs the second light reception amount indicating the light intensity of the received light. The calculation unit receives the output second light reception amount and calculates the reflection spectrum of the measurement target. The reflection spectrum is a spectrum of the reflected light.

The calculation unit calculates the reflectance of a predetermined wavelength using the second light reception amount of a plurality of wavelengths. Therefore, if there is a range in which the second light reception amount is not detected in the measured wavelength range, the reflectance at a predetermined wavelength cannot be calculated with high accuracy. The light emitting portion of the present configuration simultaneously emits the light including light having all wavelengths in a wavelength range from 400 nm to 700 nm to the measurement target. Therefore, since there is no region in which the second light reception amount is not detected in the measured wavelength range, the reflectance of a predetermined wavelength can be calculated with high accuracy.

In the spectroscopic measurement apparatus, when an intensity of the light which is dispersed from the reflected light emitted from the light emitting portion to a standard substrate and reflected by the light dispersing portion and is received by the light receiving portion is a first light reception amount, and a matrix for estimating, from the measurement reflectance spectrum measured by the spectroscopic measurement apparatus, a reference reflectance spectrum measured by a reference spectroscopic measurement apparatus is a transformation matrix, the calculation unit may receive the first light reception amount from the light receiving portion, divide the second light reception amount of each wavelength by the first light reception amount to calculate reflectance, and perform calculation to estimate the reference reflectance spectrum using the transformation matrix.

According to this configuration, when the light dispersing portion disperses the reflected light emitted from the light emitting portion to a standard substrate and reflected and the intensity of the light received by the light receiving portion is a first light reception amount. The light receiving portion outputs the first light reception amount to the calculation unit. Then, the calculation unit receives the output first light reception amount. The calculation unit calculates the reflectance by dividing the second light reception amount of each wavelength by the first light reception amount. Since the reflectance is calculated at each wavelength, the reflectance spectrum is calculated. Then, the calculation unit calculates the reflectance spectrum of the measurement target using a transformation matrix. This transformation matrix is matrix data for estimating the data of the reflectance spectrum measured by the reference spectroscopic measurement apparatus using the data of the reflectance spectrum measured by the spectroscopic measurement apparatus. Therefore, the reflectance spectrum measured by the reference spectroscopic measurement apparatus can be estimated.

In the spectroscopic measurement apparatus, the light emitting portion may be configured of a plurality of LEDs, the light emitting portion may include a first light source emitting light including light having all wavelengths in a wavelength range from 400 nm to 430 nm, and a second light source emitting light including light having all wavelengths in a wavelength range from 430 nm to 700 nm.

According to this configuration, the first light source emits light including light having all wavelengths in the wavelength range from 400 nm to 430 nm. Then, the second light source emits light including light having all wavelengths in the wavelength range from 430 nm to 700 nm. Therefore, when the first light source and the second light source are simultaneously turned on, the light including the light having all wavelengths in a wavelength range from 400 nm to 700 nm can be simultaneously emitted to the measurement target.

In the spectroscopic measurement apparatus, the first light source may be a purple LED, and the second light source may be a white LED.

According to this configuration, the light emitting portion includes a purple light emitting diode (LED) and a white LED. When the purple LED and the white LED are simultaneously turned on, the light including the light having all wavelengths in a wavelength range from 400 nm to 700 nm can be simultaneously emitted to the measurement target.

In the spectroscopic measurement apparatus, the light emitting portion may include a third light source emitting light including light having all wavelengths in the wavelength range from 400 nm to 700 nm.

According to this configuration, the third light source emits light including light having all wavelengths in the wavelength range from 400 nm to 700 nm. Therefore, when the third light source is turned on, the light including the light having all wavelengths in a wavelength range from 400 nm to 700 nm can be simultaneously emitted to the measurement target.

In the spectroscopic measurement apparatus, the third light source may be a purple white LED.

According to this configuration, the light emitting portion includes a purple white LED. When the purple white LED is turned on, the light including the light having all wavelengths in a wavelength range from 400 nm to 700 nm can be simultaneously emitted to the measurement target.

In the spectroscopic measurement apparatus, the light emitting portion may include a fourth light source emitting the light including light having all wavelengths in the wavelength range from 360 nm to 400 nm.

According to this configuration, the fourth light source is the light including light having all wavelengths in the wavelength range from 360 nm to 400 nm. Therefore, when LEDs including the fourth light source are simultaneously turned on, the light including the light having all wavelengths in a wavelength range from 360 nm to 700 nm can be simultaneously emitted to the measurement target.

In the spectroscopic measurement apparatus, the fourth light source may be a UV LED.

According to this configuration, the light emitting portion includes a UV LED. When LEDs including UV LEDs are simultaneously turned on, the light including the light having all wavelengths in a wavelength range from 360 nm to 400 nm can be simultaneously emitted to the measurement target. Then, the light including the light having all wavelengths in the wavelength range from 360 nm to 700 nm can be emitted to the measurement target.

In the spectroscopic measurement apparatus, the LEDs provided in the light emitting portion may be chip type LEDs.

According to this configuration, the LEDs provided in the light emitting portion are chip type LEDs. Since the chip type LED is thin, it can be surface mounted on a circuit substrate. Therefore, the LED can be mounted with high productivity.

The electronic apparatus includes the above-described spectroscopic measurement apparatus.

According to this configuration, the electronic apparatus includes the above-described spectroscopic measurement apparatus. The above-described spectroscopic measurement apparatus can measure reflectance with high accuracy. Therefore, the electronic apparatus can be an electronic apparatus including a spectroscopic measurement apparatus which can output reflectance with high accuracy.

The spectroscopic measurement method includes setting a transformation matrix using a reference reflectance spectrum measured by a reference spectroscopic measurement apparatus and a measurement reflectance spectrum measured by a spectroscopic measurement apparatus, simultaneously emitting light including light having all wavelengths in a wavelength range from 400 nm to 700 nm to a standard substrate using the spectroscopic measurement apparatus, dispersing light having a wavelength in a wavelength range from 400 nm to 700 nm from reflected light reflected by the standard substrate, outputting a first light reception amount which is a light reception amount indicating the light intensity of the light received by receiving the dispersed light, simultaneously emitting the light including light having all wavelengths in a wavelength range from 400 nm to 700 nm to a measurement target, dispersing light having a wavelength in a wavelength range from 400 nm to 700 nm from reflected light reflected by the measurement target, outputting a second light reception amount which is a light reception amount indicating the light intensity of the light received by receiving the dispersed light, and calculating reflectance by dividing the second light reception amount at each wavelength by the first light reception amount and performing calculation to estimate the reference reflectance spectrum using the transformation matrix.

According to this method, the light including light having all wavelengths in a wavelength range from 400 nm to 700 nm is simultaneously emitted to the standard substrate. Then, light having a predetermined wavelength with a wavelength range from 400 nm to 700 nm is dispersed from the reflected light reflected by the standard substrate. Then, the dispersed light is received and output as the first light reception amount indicating the light intensity of the received light. Next, the light including light having all wavelengths in a wavelength range from 400 nm to 700 nm is simultaneously emitted to the measurement target. Then, a light having a predetermined wavelength is dispersed from the reflected light reflected by the measurement target. Then, the dispersed light is received and output as the second light reception amount indicating the light intensity of the received light. Then, the reflectance is calculated by dividing the second light reception amount of each wavelength by the first light reception amount.

The transformation matrix is set using the reference reflectance spectrum measured by applying the standard light by the reference spectroscopic measurement apparatus before the measurement of the measurement target and the measurement reflectance spectrum measured by applying the light emitted from the light emitting portion by the spectroscopic measurement apparatus. Then, when measuring the measurement target, the reflectance of each wavelength is calculated from the light reception amount of a plurality of wavelengths. Next, the reflectance spectrum is calculated using the reflectance at each wavelength and the transformation matrix.

If there is a range in which the light reception amount is not detected in the measured wavelength range, the reflectance at a predetermined wavelength cannot be calculated with high accuracy. In the present method, the light including light having all wavelengths in a wavelength range from 400 nm to 700 nm is simultaneously emitted to the standard substrate. Then, the light including the light having all wavelengths in a wavelength range from 400 nm to 700 nm is simultaneously emitted to the measurement target. Therefore, since there is no region in which the light reception amount is not detected in the measured wavelength range, the reflectance of a predetermined wavelength can be calculated with high accuracy. Furthermore, when multiplying the transformation matrix, since there is no portion of the wavelength band where no measurement data exits, it is possible to suppress the influence of the portion of the wavelength band where no measurement data exits on other wavelength bands. As a result, the spectroscopic measurement method can accurately measure the reflectance spectrum.

What is claimed is:

1. A spectroscopic measurement apparatus comprising:
   a light emitter configured to simultaneously emit light having wavelengths in a wavelength range from 400 nm to 700 nm to a measurement target and a standard substrate, the emitted light that is reflected by the standard substrate being a first reflected light, the emitted light that is reflected by the measurement target being a second reflected light;
   a light disperser configured to disperse the first reflected light and the second reflected light to create a first dispersed light having a first predetermined wavelength and a second dispersed light having a second predetermined wavelength, respectively;
a light receiver configured to receive the first dispersed light and the second dispersed light and output a first light reception amount and a second light reception amount, respectively, the first light reception amount indicating a first light intensity of the first dispersed light, the second light reception amount indicating a second light intensity of the second dispersed light;
a memory configured to store a program and a transformation matrix, the transformation matrix being configured to minimize a difference between a reference reflectance spectrum of a reference target measured by a reference spectroscopic measurement apparatus and a measurement reflectance spectrum of the reference target measured by the spectroscopic measurement apparatus; and
a processor configured to execute the program so as to:
calculate a reflectance by dividing the second light reception amount by the first light reception amount with respect to each of the wavelengths to create a plurality of reflectances indicating the wavelengths;
calculate a target measurement reflectance spectrum based on the plurality of reflectances; and
estimate an estimation reflectance spectrum of the measurement target based on the calculated target measurement reflectance spectrum and the transformation matrix.

2. The spectroscopic measurement apparatus according to claim 1, wherein
the light emitter is configured by a plurality of light emitting diodes including a first light emitting diode and a second light emitting diode,
the first light emitting diode is configured to emit a first light having wavelengths in a wavelength range from 400 nm to 430 nm, and
the second light emitting diode is configured to emit a second light having wavelengths in a wavelength range from 430 nm to 700 nm.

3. The spectroscopic measurement apparatus according to claim 2, wherein
the first light emitting diode is a purple light emitting diode, and
the second light emitting diode is a white light emitting diode.

4. The spectroscopic measurement apparatus according to claim 2, wherein
the plurality of light emitting diodes are chip light emitting diodes.

5. The spectroscopic measurement apparatus according to claim 1, wherein
the light emitter includes a light emitting diode that is configured to emit the light having the wavelengths in the wavelength range from 400 nm to 700 nm.

6. The spectroscopic measurement apparatus according to claim 5, wherein
the light emitting diode is a purple white light emitting diode.

7. The spectroscopic measurement apparatus according to claim 1, wherein
the light emitter includes a light emitting diode that is configured to emit light having wavelengths in a wavelength range from 360 nm to 400 nm.

8. The spectroscopic measurement apparatus according to claim 7, wherein
the light emitting diode is an UV light emitting diode.

9. An electronic apparatus comprising the spectroscopic measurement apparatus according to claim 1.

10. A spectroscopic measurement method comprising:
executing on a processor the steps of:
obtaining an initial reference reflectance spectrum by using a reference spectroscopic measurement apparatus and a standard substrate; and
setting a transformation matrix indicating a relationship between the initial reference reflectance spectrum and a measurement reflectance spectrum measured by a spectroscopic measurement apparatus;
simultaneously emitting light having wavelengths in a wavelength range from 400 nm to 700 nm to the standard substrate using the spectroscopic measurement apparatus, the emitted light that is reflected by the standard substrate being a first reflected light;
dispersing the first reflected light to create a first dispersed light having a wavelength in a wavelength range from 400 nm to 700 nm;
executing on the processor the steps of:
obtaining a first light intensity of the first dispersed light; and
outputting a first light reception amount indicating the first light intensity;
simultaneously emitting the light having the wavelengths in the wavelength range from 400 nm to 700 nm to a measurement target using the spectroscopic measurement apparatus, the emitted light that is reflected by the measurement target being a second reflected light;
dispersing the second reflected light to create a second dispersed light having a wavelength in a wavelength range from 400 nm to 700 nm; and
executing on the processor the steps of:
obtaining a second light intensity of the second dispersed light;
outputting a second light reception amount indicating the second light intensity;
calculating a reflectance by dividing the second light reception amount at each wavelength by the first light reception amount; and
estimating an estimation reference reflectance spectrum of the measurement target using the transformation matrix based on the calculated reflectances.

* * * * *